US008228536B2

(12) United States Patent
Suse

(10) Patent No.: US 8,228,536 B2
(45) Date of Patent: Jul. 24, 2012

(54) IMAGE PROCESSING DEVICE, IMAGE PROCESSING METHOD, AND COMPUTER PROGRAM PRODUCT FOR IMAGE PROCESSING INCORPORATING PIPES AND FILTERS

(75) Inventor: Koichi Suse, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1091 days.

(21) Appl. No.: 12/128,819

(22) Filed: May 29, 2008

(65) Prior Publication Data
US 2008/0309991 A1 Dec. 18, 2008

(30) Foreign Application Priority Data
Jun. 13, 2007 (JP) ................................. 2007-156668

(51) Int. Cl.
*G06F 3/12* (2006.01)
*G06K 15/00* (2006.01)
*G06F 9/26* (2006.01)
*G06F 9/34* (2006.01)
(52) U.S. Cl. ...................... 358/1.15; 358/1.16; 358/1.17; 711/202; 711/203
(58) Field of Classification Search ................. 358/1.15, 358/1.16, 1.17; 711/202, 203
See application file for complete search history.

(56) References Cited

U.S. PATENT DOCUMENTS

| 6,504,621 | B1 | 1/2003 | Salgado |
| 2006/0044595 | A1 | 3/2006 | Ferlitsch |
| 2006/0077249 | A1 | 4/2006 | Oshikiri et al. |
| 2006/0274969 | A1 | 12/2006 | Nagao et al. |
| 2007/0046973 | A1 | 3/2007 | Toda |
| 2007/0136121 | A1* | 6/2007 | Katsurabayashi ................ 705/9 |
| 2007/0258098 | A1 | 11/2007 | Matsushima |
| 2008/0062464 | A1 | 3/2008 | Sugi |

FOREIGN PATENT DOCUMENTS

| EP | 1 398 953 A | 3/2004 |
| EP | 1 901 543 A | 3/2008 |
| JP | 3679349 | 5/2005 |
| JP | 2006-338502 | 12/2006 |

OTHER PUBLICATIONS

Extended European Search Report.
Japanese Office Action dated Apr. 19, 2011.

* cited by examiner

*Primary Examiner* — Twyler Haskins
*Assistant Examiner* — Fred Guillermety
(74) *Attorney, Agent, or Firm* — IPUSA, PLLC

(57) ABSTRACT

An image processing device includes an input filter configured to control an input process of data to be input as a subject of an image process, an output filter configured to control an output process of data to be output to an outside of the image processing device, a processing filter configured to process the data between the input filter and the output filter, and a pipe configured to transmit the data among the input filter, the processing filter, and the output filter.

17 Claims, 16 Drawing Sheets

FIG.14

OBTAINING STATUS TABLE 94

| | ACTUAL DATA 1 | ACTUAL DATA 2 | ACTUAL DATA 3 |
|---|---|---|---|
| PIPE 41A | ALREADY OBTAINED | ALREADY OBTAINED | ALREADY OBTAINED |
| CHILD PIPE 41C | ALREADY OBTAINED | ALREADY OBTAINED | NOT OBTAINED YET |
| OPERATIONS OF PIPE 41A TO ACTUAL DATA | DESTROY | DESTROY | KEEP |

IMAGE PROCESSING DEVICE, IMAGE PROCESSING METHOD, AND COMPUTER PROGRAM PRODUCT FOR IMAGE PROCESSING INCORPORATING PIPES AND FILTERS

BACKGROUND OF THE INVENTION

1. Field of the Invention

The present invention generally relates to image processing devices, image processing methods and computer program products for image processing. More specifically, the present invention can be applied to an image processing device, an image processing method, and a computer program product for image processing wherein the concepts of pipes and filters are applied.

2. Description of the Related Art

In recent years, image processing devices such as printers, copiers, scanners, facsimiles, and multi-functional devices configured to perform these functions, as well as computers, generally have CPUs (Central Processing Units). Each function is performed by control of applications.

For example, an image forming device described in Japanese Patent No. 3679349 has, as a platform, a function commonly used by each application. The application can be installed by using an API (Application Programming Interface) of this platform. According to this image forming device, because a function commonly used is installed as a part of the platform, it is possible to avoid separately installing the function for every application and to improve development efficiency of all the applications.

However, in the platform having the API commonly used, if the function provided by this platform or granularity of the interface is not properly designed, the development efficiency of the application may be less than expected.

For example, if this granularity is too small, while the application provides simple services, a great number of accesses to the API is required so that the source code may be complex.

On the other hand, in a case where the granularity is too large, if an application, configured to provide service where modification is made to a part of a certain function, is expected top be installed, it is necessary to modify the platform so that the number of developments may be increased. Especially, in a case where each module in the platform strongly depends on the application, it is necessary to add a new function in the platform and correct an existing part and therefore the situation may become more complex.

For example, if an application is expected to be installed where a part of the service provided by the existing application such as an input process of an image is changed, it is not possible to access the existing application in a part other than the changed part. Accordingly, it is necessary to rewrite the source code again and install a new application.

SUMMARY OF THE INVENTION

Accordingly, embodiments of the present invention may provide a novel and useful image processing device, image processing method and computer program product for image processing solving one or more of the problems discussed above.

More specifically, the embodiments of the present invention may provide an image processing device, an image processing method and a computer program product for image processing whereby it is possible to simplify customization or expansion of functions.

One aspect of the present invention may be to provide an image processing device, including: an input filter configured to control an input process of data to be input as a subject of an image process; an output filter configured to control an output process of data to be output to an outside of the image processing device; a processing filter configured to process the data between the input filter and the output filter; and a pipe configured to transmit the data among the input filter, the processing filter, and the output filter; wherein an application is formed by connecting the input filter, the processing filter, and the output filter to each other, and the pipe receives the reading request of the data including an identifier for identifying the data from the processing filter or the output filter connected to an output side of the pipe so as to transmit the reading request to the input filter or the processing filter, respectively, connected to an input side of the pipe. According to the above-mentioned image processing device, it is possible to simplify customization or expansion of functions.

The input filter and/or the processing filter may receive the reading request including the identifier and perform a process for generating data where the identifier is provided. According to the above-mentioned image processing device, it is possible to make an input side filter process data expected to be used by an output side filter with a priority so that demand of the output side can be reflected to an input side.

The identifier may be provided for the data in the input process by the input filter. The image processing device may further include an operations part configured to perform process operations of the image processing device; a control part configured to control the pipe; and a dependent pipe generation part configured to generate a dependent pipe depending on and provided to the pipe; wherein, in a case where plural output filters are selected for a single input filter selected by the operations part, the control part makes the pipe generate the dependent pipe by using the dependent pipe generation part, the control part connects a single pipe or the single dependent pipe to an input side and/or an output side of the input filter, the processing filter, and the output filter so as to perform an output process, and the dependent pipe transmits the reading request to the pipe generating the dependent pipe when the reading request is transmitted to the dependent pipe. According to the above-mentioned image processing device, in multiple outputs in a case where plural output filters are selected, each filter can perform the multiple outputs by the same process as a process where a single output filter is selected.

Each of the pipe and the dependent pipe may have a data management part configured to manage the data in the pipe and the dependent pipe, respectively, the corresponding data management parts may determine whether data corresponding to the identifier included in the reading request exist in the pipe and the dependent pipe, and the corresponding data management parts may not send the reading request in a case where the data corresponding to the identifier exist in the pipe and the dependent pipe. According to the above-mentioned image processing device, the same reading requirement is not transferred to the input side filter in an overlapped manner.

The pipe may include a request management part configured to manage whether the reading request is transmitted to the processing filter or the input filter connected to a front stage of the pipe. According to the above-mentioned image processing device, it is possible to manage whether the reading requirement received by the pipe is transferred to the input side filter.

The data management part may determiner based on the request management part, whether the reading request is transmitted to the processing filter or the input filter connected to a front stage of the pipe, and the data management part may not transmit the reading request to the input filter or the processing filter in a case where the reading request is already transmitted to the processing filter or the input filter connected to the front stage of the pipe. According to the above-mentioned image processing device, the same reading requirement is not transferred to the input side filter in an overlapped manner.

Another aspect of the present invention may be to provide an image processing method used for an image processing device, the image processing device including: an input filter configured to control an input process of data to be input as a subject of an image process; an output filter configured to control an output process of data to be output to an outside of the image processing device; a processing filter configured to process the data between the input filter and the output filter; a pipe configured to transmit the data among the input filter, the processing filter, and the output filter; wherein an application is formed by connecting the input filter, the processing filter, and the output filter to each other, the image processing method including the steps of: receiving, by the pipe, the reading request of the data including an identifier for identifying the data from the processing filter or the output filter connected to an output side of the pipe; and transmitting the reading request to the input filter or the processing filter, respectively, connected to an input side of the pipe. According to the above-mentioned image processing method, it is possible to simplify customization or expansion of functions.

Other aspect of the present invention may be to provide a computer program product for image processing, the product having an image processing program, the image processing program used for an image processing device, the image processing device having a processing device and a storage device, the image processing device including: an input filter configured to control an input process of data to be input as a subject of an image process; an output filter configured to control an output process of data to be output to an outside of the image processing device; a processing filter configured to process the data between the input filter and the output filter; a pipe configured to transmit the data among the input filter, the processing filter, and the output filter; wherein an application is formed by connecting the input filter, the processing filter, and the output filter to each other, and the image processing program is performed by implementing an image processing method by the processing device, the image processing method including the steps of: receiving, by the pipe, the reading request of the data including an identifier for identifying the data from the processing filter or the output filter connected to an output side of the pipe; and transmitting the reading request to the input filter or the processing filter, respectively connected to an input side of the pipe. According to the above-mentioned computer program product, it is possible to simplify customization or expansion of functions.

Other objects, features, and advantages of the present invention will become more apparent from the following detailed description when read in conjunction with the accompanying drawings.

BRIEF DESCRIPTION OF THE DRAWINGS

FIG. 14 shows a retrieval status table 94.

DETAILED DESCRIPTION OF THE PREFERRED EMBODIMENTS

A description is given below, with reference to the FIG. 1 through FIG. 16 of embodiments of the present invention.

In embodiments of the present invention, software architecture based on a technique called pipes and filters is applied to an image processing device, so that it is possible to simplify customization or expansion of functions of the image processing device.

Furthermore, in the embodiments of the present invention, an identifier is given to data and a reading requirement including the identifier is transferred from the output side to the input side, and thereby data reflecting the requirement of the output side is read out.

In addition, in the embodiments of the present invention, in the multiple output process where plural output filters are selected for a single input filter, a main pipe forms a dependent pipe and the main pipe and the dependent pipe are connected to each other corresponding to plural output filters. As a result of this, output processes in plural output filters are performed simultaneously in parallel.

Figure 1:
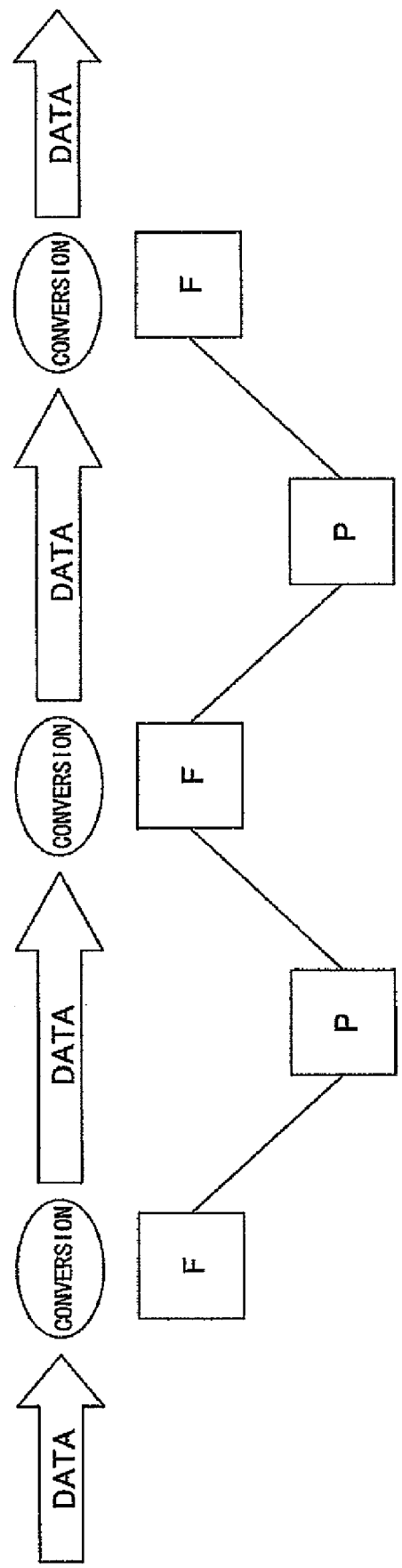
FIG. 1 is a view showing the concepts of pipes and filters.

Concepts of the above-mentioned pipes and filters are discussed with referenced to FIG. 1.

FIG. 1 is a view showing the concepts of pipes and filters. In FIG. 1, "P" indicates a pipe and "F" indicates a filter.

The filter is a program configured to perform a designated process on input data and output a process result. The pipe is a part configured to connect the filters to each other. The pipe holds a process result having been output from a filter connected to an input side of the pipe for a while and transfers data to a filter connected to an output side of the pipe. Thus, according to the concepts of pipes and filters, it is possible to continuously perform a process of the filter via the pipe.

In the image processing device of the embodiments of the present invention, a designated process by a filter is regarded as a process whereby a designated conversion is applied to input data. In other words, in the image processing device of the embodiments of the present invention, each function performed by the image processing device is regarded as part of the continuity of a "conversion process" of a document (input data). Each function of the image processing device is regarded to be formed by input, processing, and output of the document, namely data.

Accordingly, in the image processing device of the embodiments of the present invention, each of "input process", "processing process" and "output process" is regarded as a "conversion process" and a software component configured to perform a single conversion process is formed as a filter.

In the image processing device of the embodiments of the present invention, a filter configured to control an input process of the data is regarded as an input filter. A filter configured to control an processing process of the data is regarded as a processing filter. A filter configured to control an output process of the data is regarded as an output filter. Each of these filters is an independent program and there is no dependency among these filters. Accordingly, each filter can be independently installed or uninstalled with a filter unit in the image processing device.

(First Embodiment of the Present Invention)

An image processing device 100 of the first embodiment of the present invention is discussed with reference to FIG. 2. Here, FIG. 2 is a schematic hardware structure view of the image processing device 100 of the first embodiment of the present invention.

Figure 2:
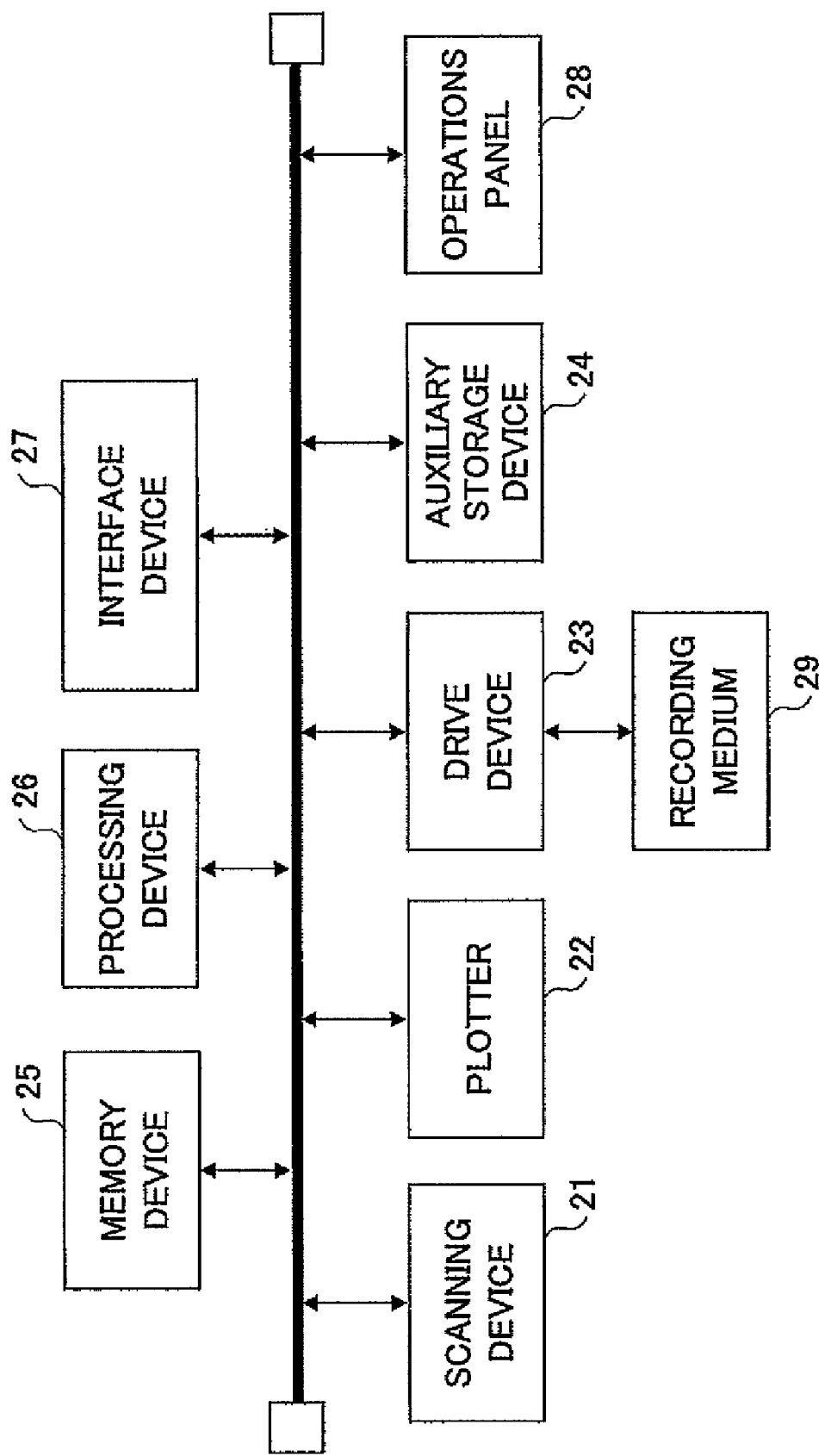
FIG. 2 is a schematic hardware structure view of an image processing device 100 of a first embodiment of the present invention.

As shown in FIG. 2, the image processing device 100 includes a scanning device 21, a plotter 22, a drive device 23, an auxiliary storage device 24, a memory device 25, a processing device 26, an interface device 27, and an operations panel 28. The scanning device 21, the plotter 22, the drive device 23, the auxiliary storage device 24, the memory device 25, the processing device 26, the interface device 27, and the operations panel 28 are connected to each other by a bus B.

The scanning device 21 includes a scanner engine and an engine control part. The scanning device 21 is configured to scan a paper so as to make image data.

The plotter 22 includes a plotter engine and an engine control part. The plotter 22 is configured to print the image data.

The interface device 27 includes a modem, a LAN card, and other devices and is used for connecting to a network.

The operations panel 28 is used for performing operations with respect to processes of the image forming process 100. The operations panel 28 includes display functions such as a touch panel.

The image processing program of the first embodiment of the present invention is at least a part of various programs configured to control the image processing device 100. The image processing program is provided by, for example, distributing a recording medium 29 where the image processing program is recorded or downloading the image processing program from the network.

A recording medium where information is optically, electrically, or magnetically recorded, such as a CD-ROM, a flexible disk, or an optical magnetic disk; a semiconductor memory where information is electrically recorded, such as a ROM or a flash memory; or the like can be used as the recording medium 29 where the image processing program is recorded.

When the recording medium 29 where the image processing program is recorded is set in the drive device 23, the image processing program is installed from the recording medium 29 into the auxiliary storage device 24 via the drive device 23. The image processing program downloaded from the network is installed in the auxiliary storage device 24 via the interface device 27.

The image processing device 100 stores not only the installed image processing program but also necessary files, data, and the like. The memory device 25 reads the image processing program from the auxiliary storage device 24 at the time when the computer starts and loads the image processing program. The processing device 26, following the image processing program being loaded in the memory device 25, performs a function of each part and each process.

In the image processing device 100, the above-discussed concepts of pipes and filters are applied to software architecture configured to perform various functions of the image processing device 100.

Figure 3:
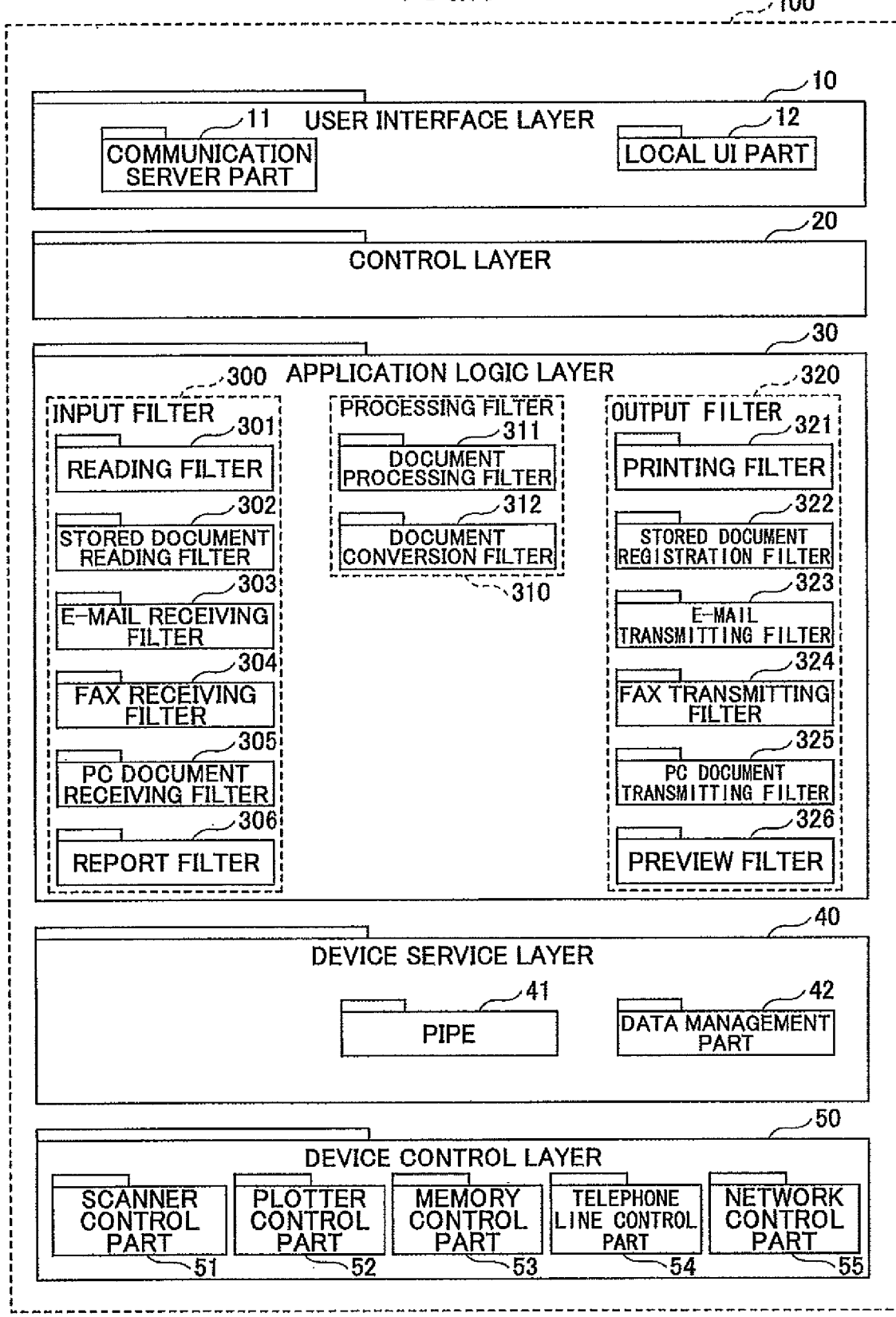
FIG. 3 is a software structure view of an image processing device 100 of a first embodiment of the present invention.

FIG. 3 is a software structure view of the image processing device 100 of the first embodiment of the present invention.

The image processing device 100 is a multiple function device configured to perform plural functions such as a printer, a copier, a scanner and a facsimile machine.

Software configured to perform functions of the image processing device 100 has a layered structure. The software is formed by a user interface layer 10, a control layer 20, an application logic layer 30, a device service layer 40, and a device control layer 50. Higher and lower relationships of each layer are based on access relationships among the layers. In other words, in the example shown in FIG. 3, a high-order layer accesses a low-order layer.

In the image processing device 100, when an order from the user for performing various kinds of functions is received by the user interface layer 10, the user interface layer 10 accesses the control layer 20 so as to control the application logic layer 30 based on this performing request. The application logic layer 30 runs the application configured to perform the function required based on the order from the control layer 20. Based on the result, the device layer 40 and the device control layer 50 control the hardware resources of the image processing device 100. In the image processing device 100, output results corresponding to the functions received by the user interface layer 10 are retrieved.

Next, each layer is discussed.

The user interface layer 10 includes, for example, a communication server part 11 and a local UI (User Interface) part 12. The interface layer 10 has a function for receiving performing requests for performing each function of the image processing device 100. Here, each function is, for example, a copier function, a printing function, a scanning function, or a FAX function.

In the user interface layer 10, for example, the communication server part 11 may receive the performing request from a client PC (Personal Computer) not shown in FIG. 3 or the like via a network. The local UI part 12 may receive the performing request via, for example, the operations panel 28 provided in the image processing device 100. Details of the operations panel 28 are discussed below. The performing request received by the user interface layer 10 is transferred to the control layer 20.

A function for controlling a process whereby each function of the image processing device 100 is performed is installed in the control layer 20. More specifically, for example, the control layer 20 connects each filter in the application logic layer 30 by the pipe 41 corresponding to the requested function and control performing the functions by using the connected filters.

In addition, the control layer 20 corresponds to a control part in claims described below and controls the pipe 41. The control layer 20 controls the pipe 41 based on the performing request received by the user interface layer 10. Control of the pipe 41 by the control layer 20 is discussed below.

The function of the image processing device 100 discussed in this embodiment means definition of a single unit service provided to the user by the image processing device 100 (service from the input of the request to final output). The function of the image processing device 100 is equivalent to an application providing the single unit service from the perspective of software.

Various filters that are component groups configured to perform a part of functions provided in the image processing device 100 are provided in the application logic layer 30.

In the application logic layer 30, a single function is performed by combining plural filters by control of the control layer 20. The application logic layer 30 includes an input filter 300, a processing filter 310, and an output filter 320. Each of these filters is operated based on the same definition and controlled based on the same definition by the control layer 20. Details of each filter are discussed below.

A lower order function that each filter of the application logic layer 30 commonly uses is installed in the device service layer 40. A pipe 41, a data management part 42, and others are provided in the device service layer 40 of the image processing device 100. The pipe 41 performs functions of the pipe discussed above. The pipe 41 transfers the output result of a certain filter among filters provided in the application logic layer 30 to another filter.

User information registered in a database in the image processing device 100 by, for example, a user or document data or image data where various kinds of processes are applied in the image processing device 100 may be stored in the data management part 42.

A driver that is a program configured to control hardware is installed in the device control layer 50 of the image processing device 100 of this embodiment. The device control layer 50 includes, for example, a scanner control part 51, a plotter control part 52, a memory control part 53, a phone line control part 54, a network control part 55, and other parts. Each control part controls each device named in that control part.

In the following explanation, each filter provided in the application logic layer 30 is further discussed.

The input filter 300 of the image processing device 100 is configured to control an input process for data being input from outside of the image processing device 100. The input filter 300 includes a reading filter 301, a stored document reading filter 302, an e-mail receiving filter 303, a FX receiving filter 304, a PC document receiving filter 305, a report filter 306, and other filters.

The reading filter 301 is configured to control, for example, reading the image data input by the scanner and outputting the read image data.

The e-mail receiving filter 303 is configured to receive an e-mail in the image processing device 100 and to output data included in the received e-mail.

The FAX receiving filter 304 is configured to control FAX receiving and outputs received data.

The PC document receiving filter 305 is configured to receive printing data from the client PC not shown or the like and to output the printing data.

The report filter 306 is configured to arrange setting information or hysteresis information of the image processing device 100 in, for example, a table format so as to output the arranged data. Here, the stored document reading filter 302 is configured not to read data from an outside of the image processing device 100 but read data stored in, for example, the data management part 42 in the image processing device 100 or a storage device, not shown in FIG. 3, of the image processing device 100 so as to output the stored data.

The processing filter 310 of the image processing device 100 is configured to apply a designated process to data input from an input side pipe of the processing filter 310 and to output the process result to an output side filter of the processing filter 310. The processing filter 310 includes a document processing filter 311, a document conversion filter 312, and other filters.

The document processing filter 311 is configured to apply a designated image conversion process to input data so as to output the result. This image conversion process may be, for example, an aggregation process, an expansion process, a contraction process, or the like, of the input data.

The document conversion filter 312 applies a rendering process to the input data so as to output the results. In other words, Post Script data input to the document conversion filter 312 is converted into bit map data so as to be output.

The output filter 320 of the image processing device 100 is configured to control the output process for the input data and output the results to the outside of the image processing device 100. The output filter 320 includes a printing filter 321, a stored document registration filter 322, an e-mail transmitting filter 323, a FAX transmitting filter 324, a PC document transmitting filter 325, a preview filter 326, and other filters.

The printing filter 321 is configured to make the plotter output (print) the input data. The e-mail transmitting filter 323 is configured to attach the input data to an e-mail and send the e-mail.

The FAX transmitting filter 324 is configured to make FAX transmission of the input data. The PC document transmitting filter 325 is configured to transmit the input data to a client PC not shown in FIG. 3.

The preview filter 326 is configured to preview the input data using the operations panel 28 of the image processing device 100.

The data being output from the document registration filter 322 are exceptionally output to not the outside of the image processing device 100 but the storage device or the data management part 42 in the image processing device 100 so as to be stored.

In the application logic layer 30, each filter is combined so that each function of the image processing device 100 is performed. According to the above-discussed structure, in the image processing device 100, it is possible to perform various functions based on the combination of the filters and the pipe. More specifically, for example, in a case where the copier function is expected to be performed, the reading filter 301, the document processing filter 311, and the printing filter 321 may be combined.

Before explaining the operations of the image processing device 100 of this embodiment, basic operations of the image processing device where the concepts of pipes and filters are applied are discussed with reference to FIG. 4.

Figure 4:
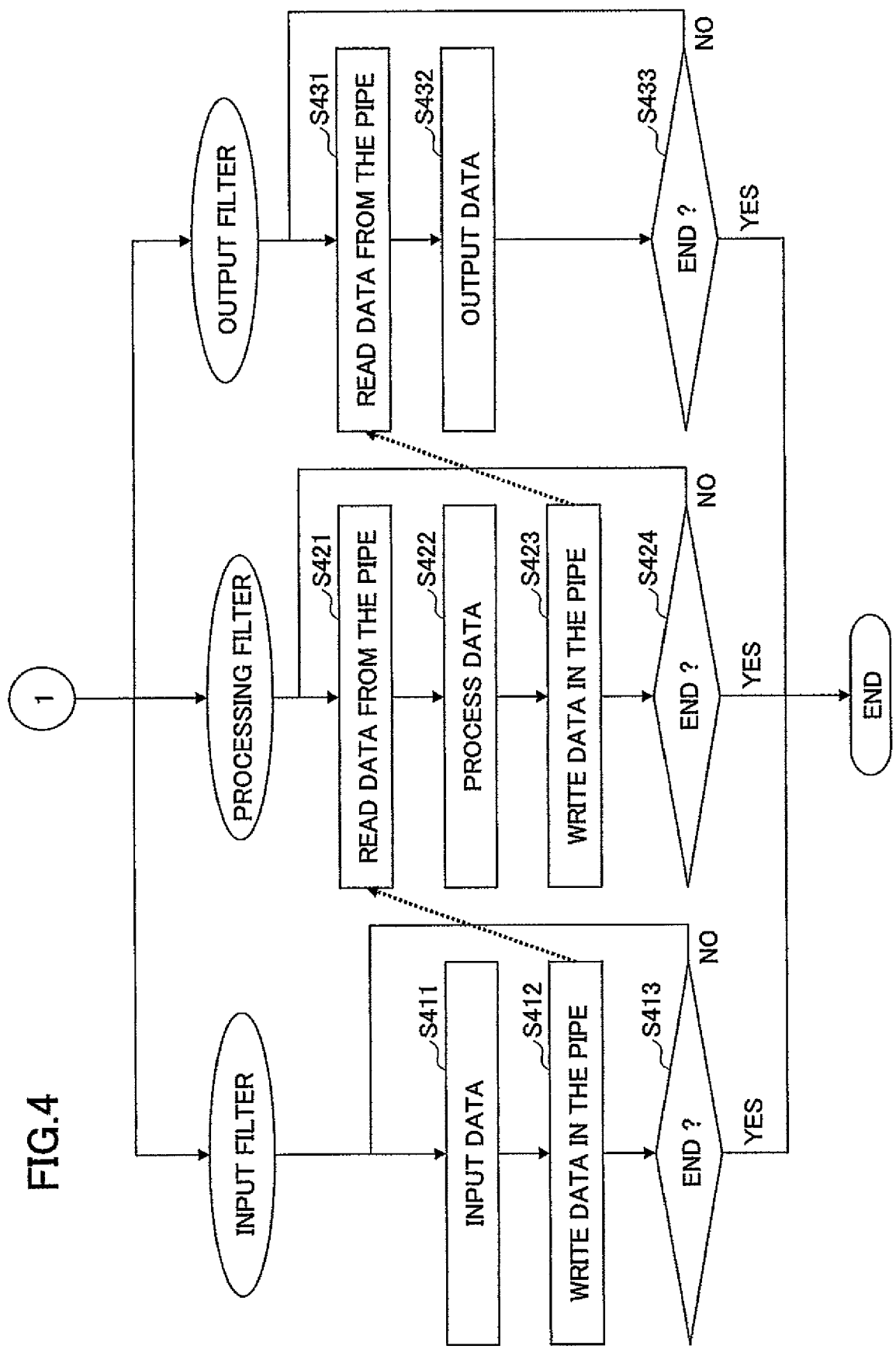
FIG. 4 is a flowchart for explaining operations for performing a function of an image processing device where the concepts of pipes and filters are applied.

FIG. 4 is a flowchart for explaining operations for performing a function of the image processing device 100 where the concepts of pipes and filters are applied.

The input filter inputs data from the input device in step S411 and outputs the data to the pipe connected to the output side in step S412. In a case where the data are input at plural time intervals such that plural sheets of paper are scanned, input of the data and output of the result to the pipes are repeated.

When a process of all input data is completed (YES in step S413), the process of the input filter is completed.

When the processing filter 310 detects input of the data to the pipe connected to the input side, the process starts.

First, the data are read from the pipe in step S421 and the image processing is applied to the data in step S422.

Next, the data as process results are output to the pipe connected to the output side in step S423. When a process of inputting all the data to the input side pipe is completed (YES in step S424), a process of the processing filter 310 is completed.

When the output filter 320 detects input of the data to the pipe connected to the input side, the output filter 320 starts a process.

First, the output filter 320 reads the data from the pipe in step S431. Then the output filter 320 outputs the read data by using an output device in step S432. After processing all the data input to the input side pipe (YES in step S433), the process of the output filter 320 is completed.

Thus, in the image processing device 100, each function is performed by using each corresponding filter as a component. Accordingly, it is possible to simply customize or expand the functions. In other words, because there is no functional dependence among the filters and independence is maintained, it is possible to easily develop new functions (applications) by newly adding a filter or changing a combination of the filters. Hence, when installation of a new application is requested, if a part of a process of the application is not installed, only a filter configured to perform the part of the process may be developed and installed.

Accordingly, it is possible to decrease the frequency of modification generated corresponding to equipment of the new application for a layer lower than the control layer 20 and the application logic layer 30. Therefore, it is possible to provide a stable platform.

Because of this, it is possible to improve the development efficiency of the application without an influence of functions provided by the platform or the granularity of the interface. In addition, if an application is expected to be installed where a part of the service provided by the existing application is to be changed, only that part of the filter providing this service need be changed. Hence, there is no need to write new source code and it is possible to improve the development efficiency.

In the image processing device 100 of this embodiment of the present invention, operations for transmitting the reading request by the pipe 41 including an identifier of the data from the output side to the input side are performed in addition to the basic operations discussed above.

A structure for performing the operations is discussed below.

The input filter 300 of this embodiment includes a function for providing an identifier for identifying data to the input data in the input process. The identifier of the data in this embodiment may be provided in the order where, for example, the input filter 300 retrieves the data. For example, in a case where data are read by the scanning device 21, the number may be provided in the sequential order where the scanning device 21 reads and this number may be the identifier.

This identifier is not limited to the sequential order where the data are retrieved as discussed above, as long as the input data can be identified. In addition, a method for providing the identifier may not be limited to the above-mentioned method. For example, the identifier may be provided based on the size of the input data or the like.

When the output filter 320 of this embodiment receives information for specifying the data to be output by the operations panel 28 or the like, the output filter 320 includes this information as an identifier of the data in the reading request. In addition, the output filter 320 transmits the reading request of the data including the identifier of the data to the pipe connected to a front stage of the output filter 320.

It is preferable that, in the image processing device 100 of this embodiment, an identifier provided for the data in the input filter 300 and information for specifying the data retrieved by the output filter 320 correspond to each other.

For example, in a case where the copying process is performed in the image processing device 100, the number of the retrieved data item is regarded as the identifier in the input filter 300. The number of pages retrieved by the operations panel 28 is regarded as information for specifying the data in the output filter 320.

The pipe 41 of this embodiment transmits a reading request of the data including the identifier of the data from the output side of the pipe 41 to the input side of the pipe 41 by functions of the above-mentioned input filter 300 and the output filter 320.

Accordingly, in the image processing device of this embodiment, even if the sequential order where the input filter 300 retrieves the data and the sequential order of the data required by the output filter 320 in actual image processing are different from each other, regardless of the sequential order where the input filter 300 retrieves the data, it is possible to specify the data requested by the output filter 320 and retrieve the data.

Accordingly, in the image processing device 100 of this embodiment, the reading request of the output side is transmitted to the input side so that entire process speed can be improved.

Next, operations of the image processing device 100 of this embodiment are discussed with reference to FIG. 5.

Figure 5:
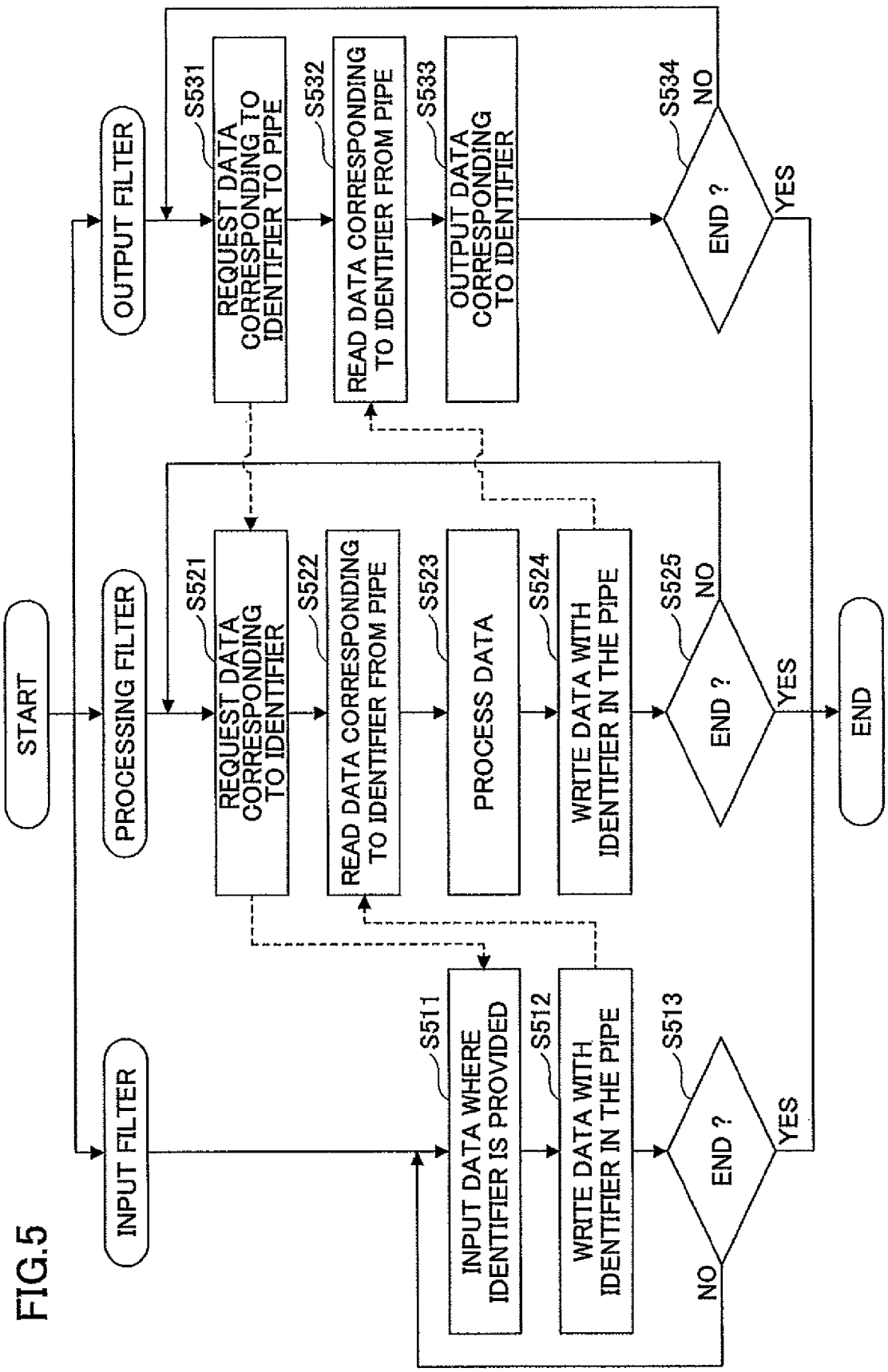
FIG. 5 is a flowchart for explaining an operation of each filter in the image processing device 100 of the first embodiment of the present invention.

FIG. 5 is a flowchart for explaining an operation of each filter in the image processing device 100 of this embodiment.

The input filter 300 inputs data from the input device and provides an identifier for identifying data to the input data in step S511. The input filter 300 correlates the data and the identifier provided to the data to each other and outputs the data with the identifier to the pipe connected to the output side of the input filter 300 in step S512.

When data are input at plural times such that plural sheets of papers are scanned, input of the data and output of the result to the pipe are repeated. After a process for all input data are completed (YES in step S513), a process of the input filter 300 is completed.

When the processing filter 310 receives the reading request including the identifier of the data from the pipe connected to the output side of the processing filter 310, the processing filter 310 transmits the reading request of the data corresponding to the identifier to the pipe connected to the input side of the processing filter 310 in step S521.

The processing filter 310 reads the data corresponding to the identifier from the pipe in step S522 and performs a process for processing written data in step S523.

In addition, the processing filter 310 correlates the data after the process is applied and the identifier of the data to each other so as to write them in the pipe connected to the output side in step S524. In a case where there are no data corresponding to the identifier in the input side pipe (YES in step S525), the process of the processing filter 310 is completed.

The output filter 320 transmits the reading request including the identifier for identifying the data specified as the data to be output to the pipe connected to the input side of the output filter 320 in step S531.

In the image processing device 100 of this embodiment, by operating the operations panel 28, for example, the data to be output may be determined. More specifically, for example, in a case where the printing process from page 5 through page 7 is selected by the operations panel 28, the output filter 320 may regard the specified data as "image data from page 5 through page 7" and may regard the identifier of the specified data as "page 5 through page 7".

The output filter 320 reads the data linked to the identifier from the pipe connected to the front stage of the output filter 320 in step S532. The data to be read are data already processed by the processing filter 310. The output filter 320 outputs the data being read in step S533. In a case where there are no data corresponding to the identifier in the input side pipe (YES in step S534), the output filter 320 completes the process of the output filter 320.

Next, a flow of transmission of the reading request in the image processing device of this embodiment is discussed with reference to FIG. 6.

Figure 6:
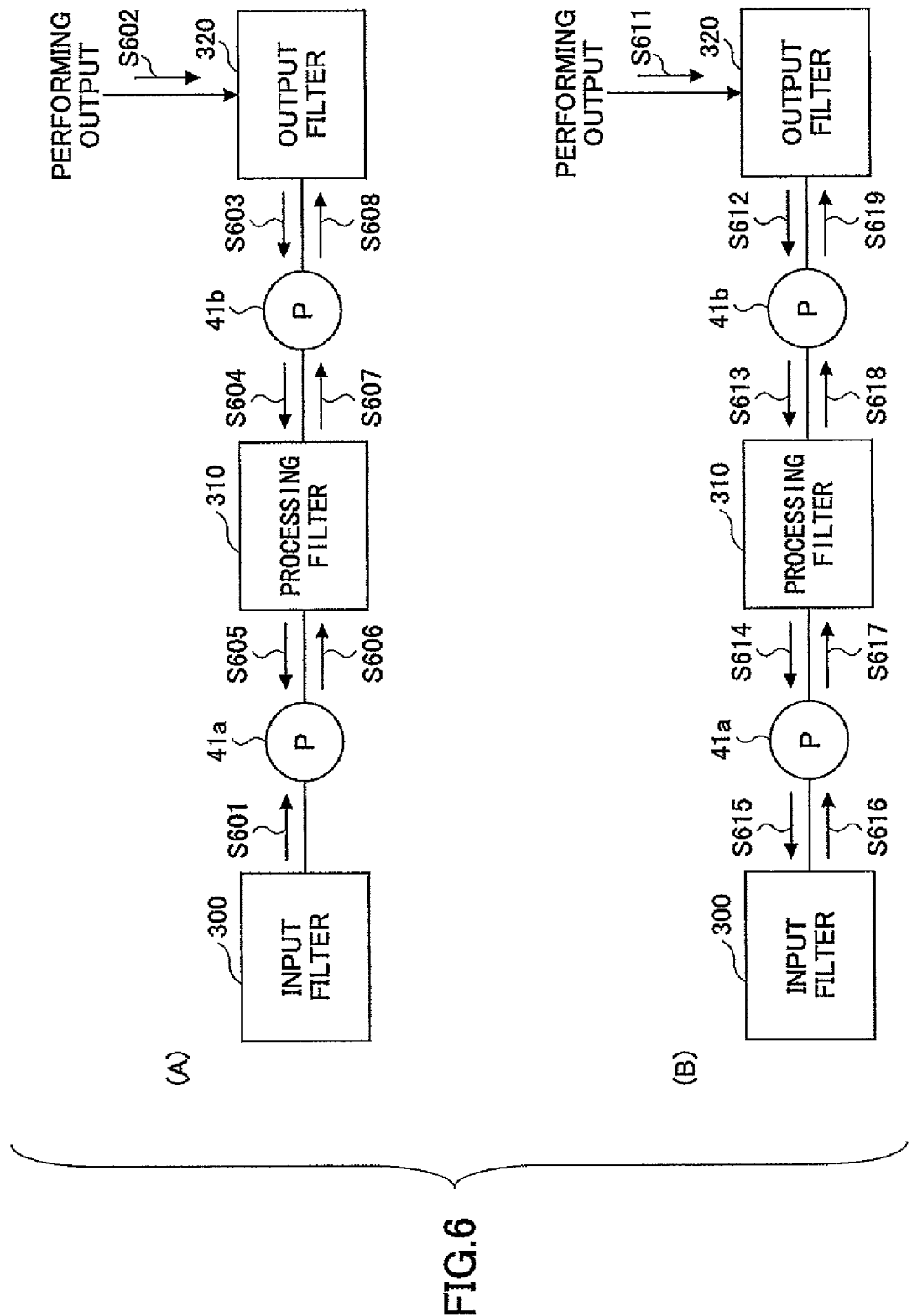
FIG. 6(A) and FIG. 6(b) are block diagrams for explaining transmission of reading requests in the image processing device 100 of the first embodiment of the present invention.

FIG. 6(A) and FIG. 6(*b*) are block diagrams for explaining transmission of a reading request in the image processing device 100 of this embodiment.

In an example shown in FIG. 6(A), the input filter 300, the reading filter 301, and the FAX receiving filter 304 are provided. In this example, the sequential order of input of the data is determined. The input filter 300 provides the sequential order where data are input, as the identifier, to the data.

In the image processing device 100, the input filter 300 and the processing filter 310 are connected to each other by the pipe 41*a*. The processing filter 310 and the output filter 320 are connected to each other by the pipe 41*b*.

In the image processing device 100, when the data are input from outside, the input filter 300 provides the identifier to the input data, relates the data and the identifier to each other, and writes the data and the identifier into the pipe 41*a* in step S601.

When the output filter 320 receives the performing request of the output process of the specified data in step S602, the output filter 320 transmits the reading request including the identifier for identifying the data specified as the data to be output to the pipe 41*b* connected to the front stage of the output filter 320 in step S603. The pipe 41*b* transmits the reading request including the identifier of the data to the process filter 310 connected to the input side of the pipe 41*b* in step S604.

Because the process filter 310 performs the processing process on the data corresponding to the identifier included in the reading request, the process filter 310 transmits the reading request to the pipe 41*a* in step S605. The data corresponding to the identifier are written in the pipe 41*a*. When the pipe 41*a* receives the reading request from the processing filter 310, the data corresponding to the identifier included in the reading request are written in the processing filter 310 in step S606.

The processing filter 310 performs the processing process on the written data and outputs the processed data to the pipe 41*b* in step S607. The output filter 320 detects that the data are written in the pipe 41*b* and reads the data written in the pipe 41*b* in step S608. The output filter 320 performs the output process to the read data so as to output the data.

In an example shown in FIG. 6(B), similar to a stored document reading filter 302, the data stored in the storage device in the image forming device 100 such as a hard disk drive are written in advance in the pipe 41*a*. In the example shown in FIG. 6(B), because the identifier is provided in the data so as to be stored in the storage device, the input filter 300 can write optional data to the pipe 41*a*.

The processes from step S611 to step S614 in FIG. 6(B) are the same as those from step S602 to step S605 in FIG. 6(A). When the pipe 41*a* receives the reading request including the identifier in step S614, the pipe 41*a* transmits the reading request to the input filter 300 in step S615.

The input filter 300 writes the data corresponding to the identifier included in the reading request in the pipe 41*a* in step S616. When the processing filter 310 detects that the data corresponding to the identifier are written in the pipe 41*a*, the processing filter 310 reads the data from the pipe 41*a* in step S617. The processes of step S618 and step S619 are the same as those of step S607 and step S608 in FIG. 6(A).

Accordingly, in the image processing device 100 of this embodiment, the reading request from the output side is transmitted to the input side so that entire process speed can be improved.

In addition, according to the image processing device 100 of this embodiment, various functions can be performed by combining the filters and the pipes. Hence, it is possible to simplify the customization or expansion of the functions.

(Second Embodiment of the Present Invention)

Next, a second embodiment of the present invention is discussed with reference to FIG. 7 through FIG. 16.

In the second embodiment of the present invention, a multi-output process is applied to the image processing device 100 of the first embodiment of the present invention. Accordingly, a process corresponding to multiple outputs is discussed in the second embodiment of the present invention and in FIG. 7 through FIG. 16, parts that are the same as the parts shown in FIG. 1 through FIG. 6 are given the same reference numerals, and explanation thereof is omitted.

Next, the multiple output process of the second embodiment of the present invention is discussed.

In the image processing device, there is a case where data input from a single input filter 300 may be output by plural output filters 320 by different output methods.

Figure 7:
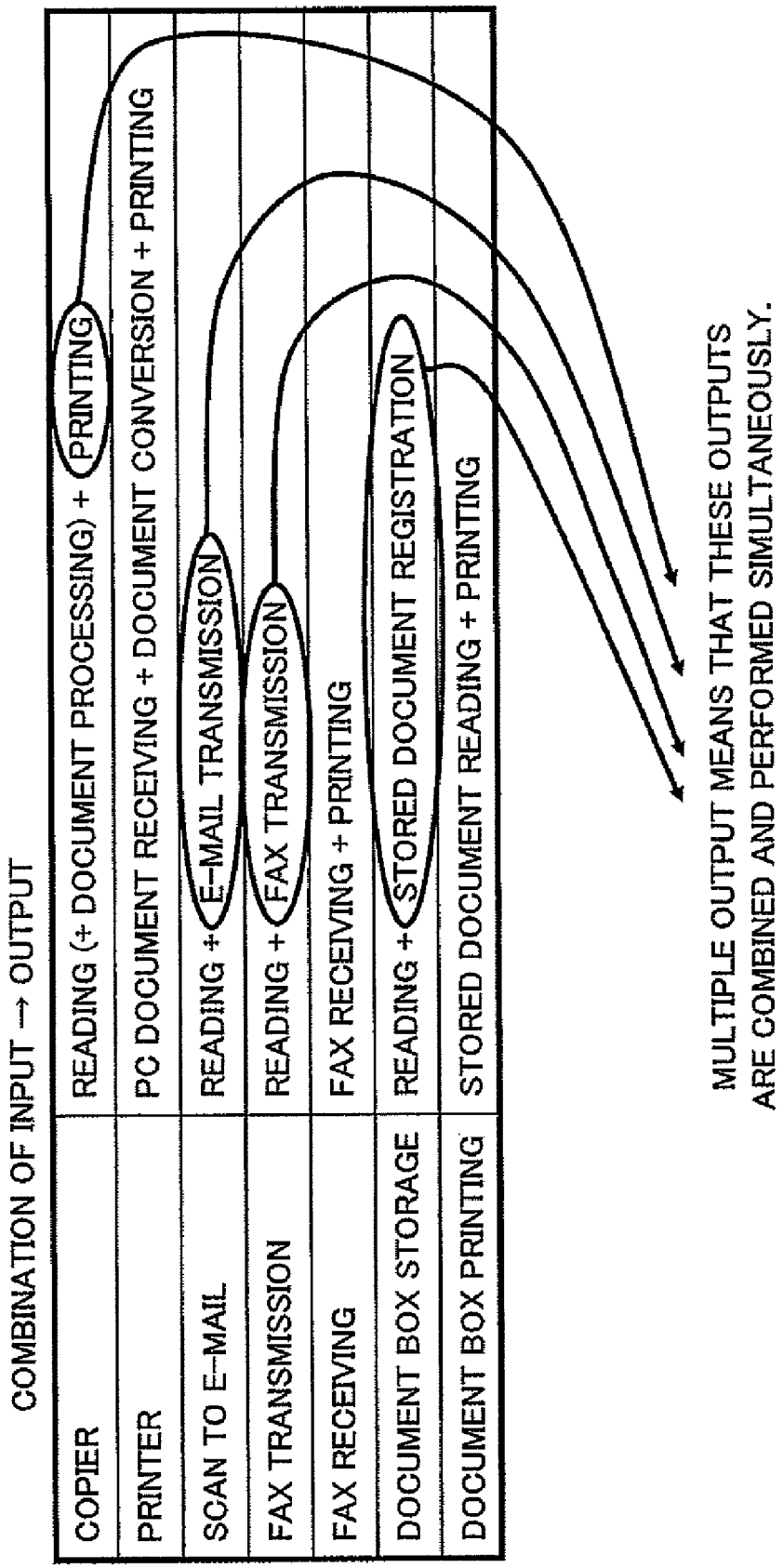
FIG. 7 is a view for explaining an example of a combination of an input filter and an output filter.

FIG. 7 is a view for explaining an example of a combination of the input filter and the output filters.

In an example shown in FIG. 7, the data being read by the reading filter 301 included in the input filter 300 are output as four kinds of output data by using four output filters, namely the printing filter 321, the stored document registration filter 322, the e-mail transmission filter 323, and FAX transmission filter 324 included in the output filter 320. Thus, a process where data are input from a single input filter 300 and are output from plural output filters 320 is called a multiple output process.

It is relatively easy to perform the multiple output process in the image processing device where the concepts of pipes and filters are applied. However, depending on the design of the pipe, the memory capacity provided in the image processing device may have an influence. In addition, operations of start, interruption, restart, and stop of the process in the image processing device may not be controlled for every output filter. In addition, an independence of the process in each filter may not be maintained due to the multiple output process.

In this embodiment, a parent-child relationship is made to the pipe in the case of the multiple output process so that the above-mentioned problem can be solved, in addition to the effect achieved by the first embodiment of the present invention.

In the second embodiment of the present invention, the pipe 41A is made to have the function of a parent pipe and the parent pipe is made to generate a child pipe in the multiple output process. The child pipe performs the same operations as those in a single output process where a single output filter 320 is selected compared to a single input filter 300. The parent pipe controls the status of both parent pipe and the child pipe and performs management.

Furthermore, in the image processing device of the second embodiment of the present invention, the parent pipe and the child pipe and plural output filters 320 correspond to each other and are connected to each other. The parent pipe corresponds to a pipe in the claims below. The child pipe corresponds to a dependent pipe in the claims below.

With this structure, in the multiple output process, a certain parent pipe or a certain child pipe is connected to a front stage of the output filter. In addition, each filter is connected to the front stage and the subsequent stage of the parent pipe and the child pipe. In other words, the connection status of the pipe and the filter is the same as that in a case of the single output process. Because of this, in the second embodiment of the present invention, it is possible to control of the filter in the multiple output process in the same manner as the single output process.

Next, control of the pipe in the second embodiment of the present invention is discussed below.

In the second embodiment of the present invention, when plural output filters 320 are selected by the operations panel 28 so that execution of the process is ordered, the control layer 20 starts control of the pipe.

Figure 8:
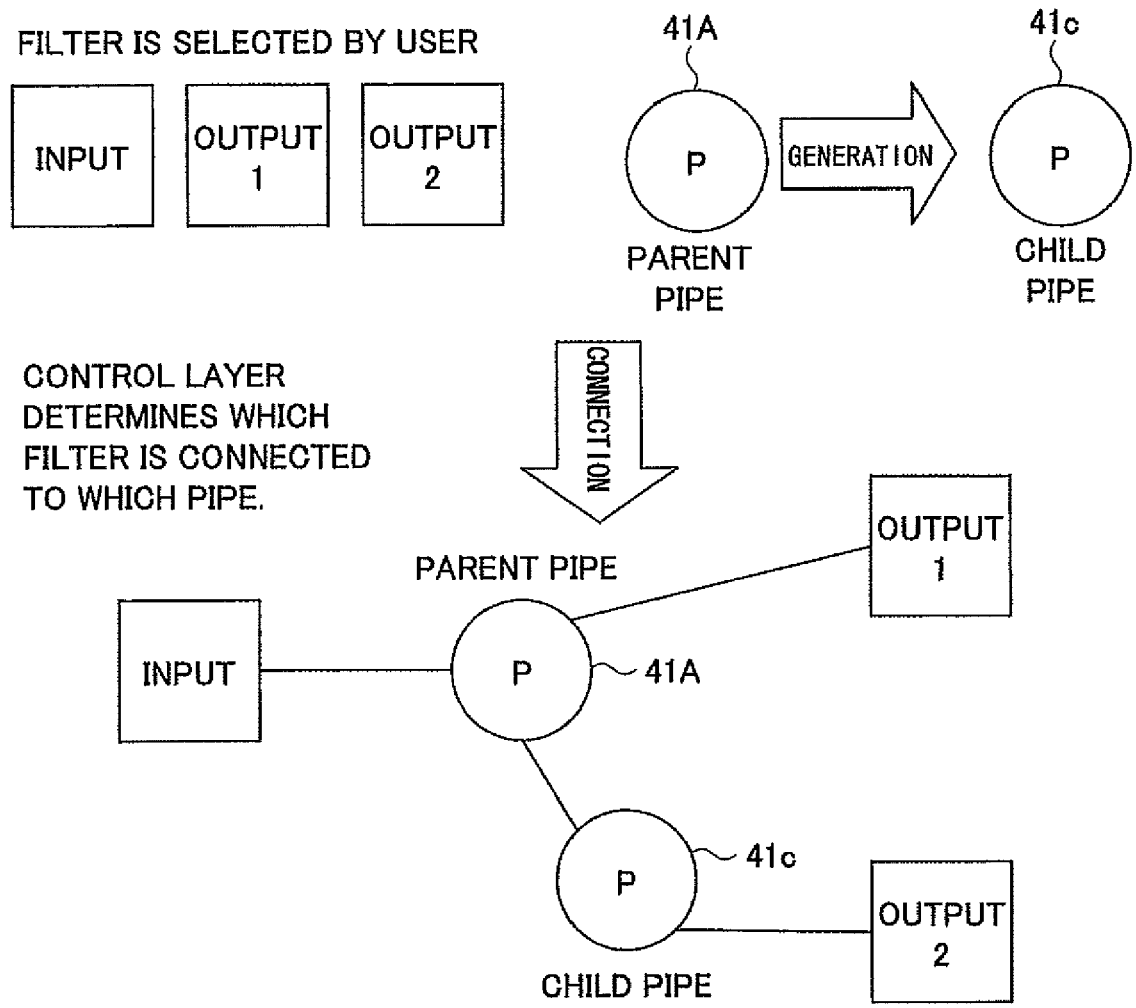
FIG. 8 is a view for explaining control of a pipe 41A by a control layer 20.

FIG. 8 is a view for explaining control of the pipe 41A by the control layer 20.

The control layer 20 generates the child pipe 41c by a child pipe generation function of the pipe 41A that is a parent pipe. Details of the function of the pipe 41A as the parent pipe are discussed below.

When the child pipe 41c is generated, the control layer 20 determines which filter is connected to which pipe based on the selected input filter 300 and the output filter 320.

The control layer 20 connects the input filter 300 to the front stage of the pipe 41A as the parent pipe. The control layer 20 also connects a single output filter 320 to the pipe 41A and the child pipe 41c. In this case, the control layer 20 may be set in advance so that proper connection can be selected depending on kinds of the filter and the pipe. Furthermore, in the control layer 20, in a case where the processing filter is provided between the input filter and the output filter, a single pipe is connected to the front stage and the subsequent stage of the processing filter.

Functions of the pipe 41A of the second embodiment of the present invention are discussed with reference to FIG. 9.

Figure 9:
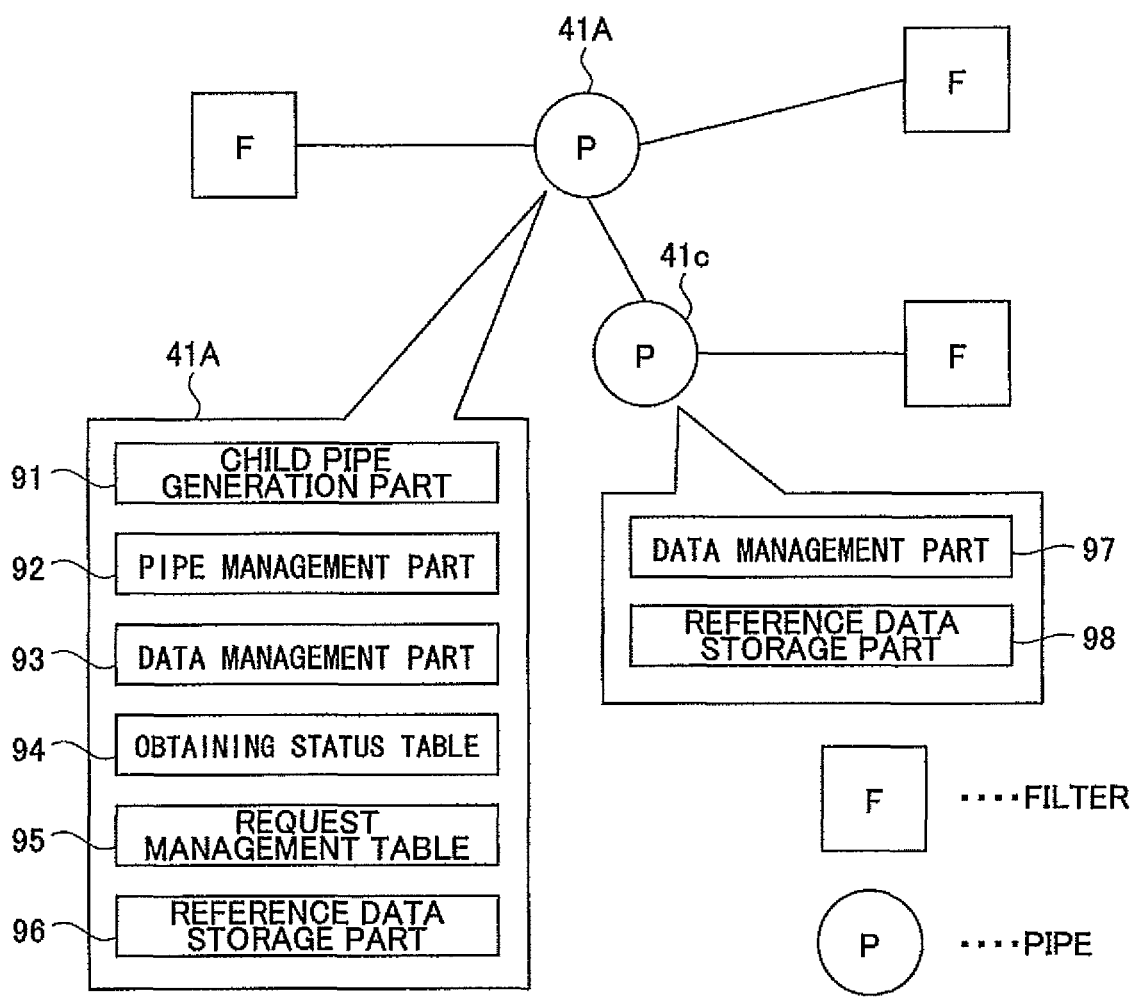
FIG. 9 is a view for explaining a function of a pipe 41A of a second embodiment of the present invention.

FIG. 9 is a view for explaining a function of the pipe 41A of the second embodiment of the present invention.

The pipe 41A is, for example, a memory (HDD: Hard Disk Drive). Each function of the pipe 41A discussed below may be performed by a program stored in this memory.

The pipe 41A includes a child pipe generation part 91, a pipe management part 92, a data management part 93, a retrieval status table 94, a request management table 95, and a reference data storage part 96.

The child pipe generation part 91 works so that the pipe 41A as the parent pipe generates the child pipe 41c and corresponds to a dependent pipe generation part of claims below.

The pipe management part 92 works so that the pipe 41A controls and manages the status of the pipe 41A and the child pipe 41c.

The data management part 93 is configured to manage actual data being output from the filter connected to the front stage of the pipe 41A. In addition, the data management part 93 determines whether data corresponding to the identifier included in the reading request exist in the pipe 41A so as to manage the reading request based on the result of the determination. The data management part 93 corresponds to a data management part in claims below.

Information indicating the reference status of the actual data in the pipe 41A and the child pipe 41c is stored in the retrieval status table 94.

The request management table 95 is configured to manage the reading request of the data corresponding to the filter connected to the front stage of the pipe 41A. The request management table 95 corresponds to a request management part in claims below.

Reference data indicating a reference subject of the actual data are stored in the reference data storage part 96.

The child pipe 41c includes a data management part 97 and a reference data storage part 98.

The data management part 97 is configured to determine whether data corresponding to the identifier included in the reading request is in the child pipe 41c so as to manage the reading request based on the result of determination. The data management part 97 corresponds to a data management part in claims below.

The reference data as well as the reference data of the pipe 41A are stored in the reference data storage part 98.

Next, the multiple output process of the pipe 41A and the child pipe 41c is discussed with reference to FIG. 10.

Figure 10:
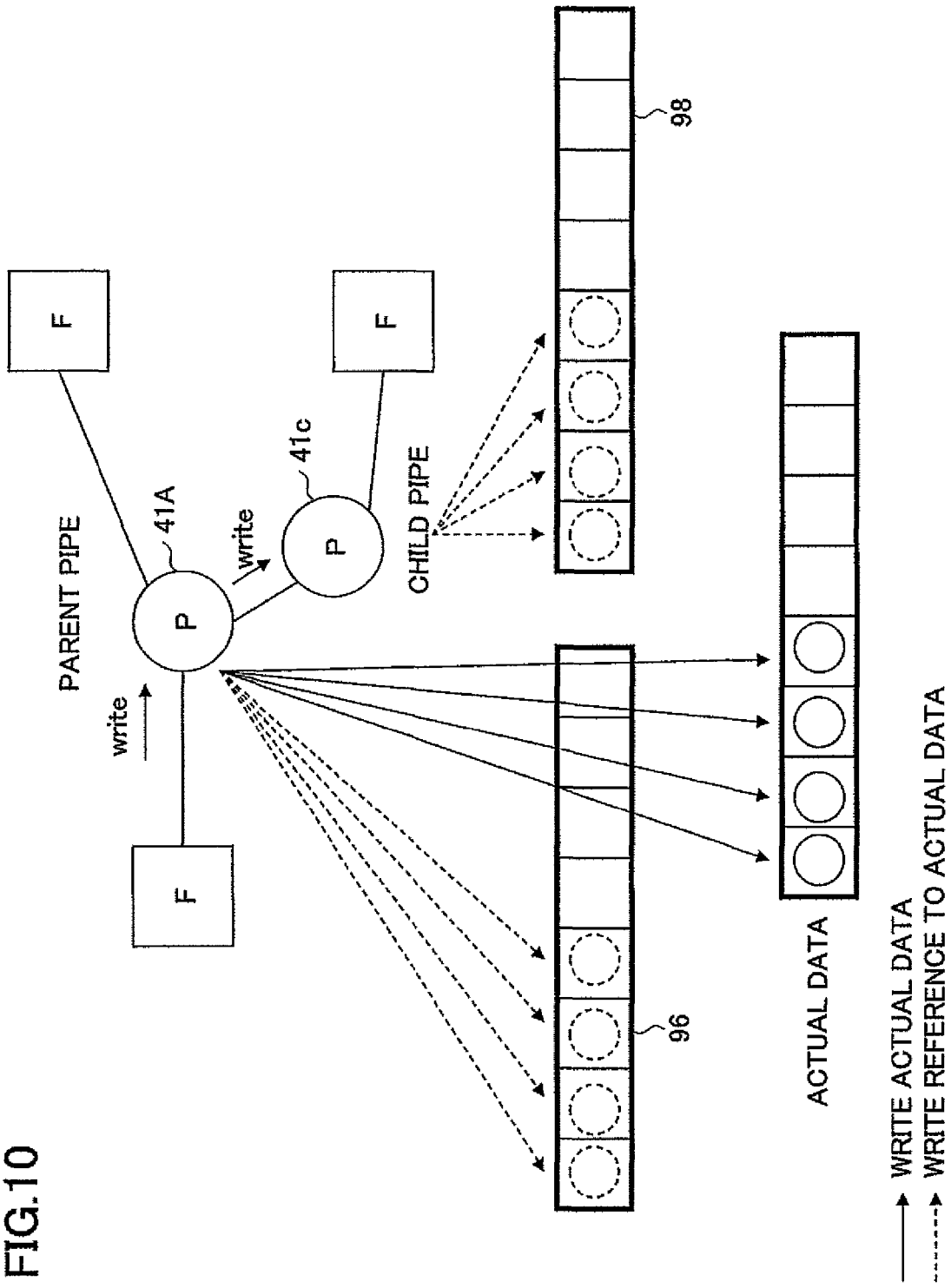
FIG. 10 is a view for explaining basic operations in a case where data are written in the pipe 41A of the second embodiment of the present invention.

FIG. 10 is a view for explaining basic operations in a case where data are written in the pipe 41A of the second embodiment of the present invention.

In the example shown in FIG. 10, there are two output filters selected in the multiple output process. A single output filter is connected to the subsequent stage of the pipe 41A (parent pipe) and the subsequent stage of the child pipe 41c. The filter to be connected to the front stage of the pipe 41A may not be an input filter but, instead, a processing filter. In addition, a filter of the subsequent stage of the pipe 41A and the child pipe 41c may not be an output filter but, instead, a processing filter.

In the pipe 41A, when the data are output from the front stage filter, the data management part 93 writes actual data which are output data to a memory controlled by the memory control part 53. In addition, the data management part 93 writes reference data to the reference data storage part 96 of the pipe 41A.

The reference data are used for referring to actual data written in the memory. The reference data are information indicating, for example, a place where the actual data are written. It is possible to access the actual data written in the memory by following the reference data. The reference data may be provided from, for example, the memory control part 53 to the pipe 41A.

When writing the actual data in the memory and writing the reference data in the reference data storage part 96 are completed in the pipe 41A, the pipe 41A writes the reference data in the reference data storage part 98 of the child pipe 41c. The reference data written in the reference data storage part 96 of the child pipe 41c are the same as the reference data written in the reference data storage part 96 of the pipe 41A.

Thus, in the second embodiment of the present invention, the actual data being output from the filter of the front stage of the pipe 41A are stored for a while in the memory which is a storage device outside the pipe 41A. Access from the pipe (parent pipe) 41A and the child pipe 41c to the memory can be made by storing the reference data corresponding to the actual data in both the pipe (parent pipe) 41A and the child pipe 41c.

Because of this, in this embodiment, even if the number of pipes is increased by the multiple output process, the amount of the actual data actually written in the memory is the same. Accordingly, the memory is not pressed by execution of the multiple output process. While the amount of the data is increased by the reference data written in each pipe in the multiple output process, the amount of the reference data is extremely small compared to the amount of the actual data. Hence, it is not necessary to consider the amount of the reference data.

Next, basic operations in a case where the data are read from the pipe 41A and pipe 41c by the filter of the subsequent stage of the pipe 41A and the child pipe 41c as shown in FIG. 10 are discussed with reference to FIG. 11.

Figure 11:
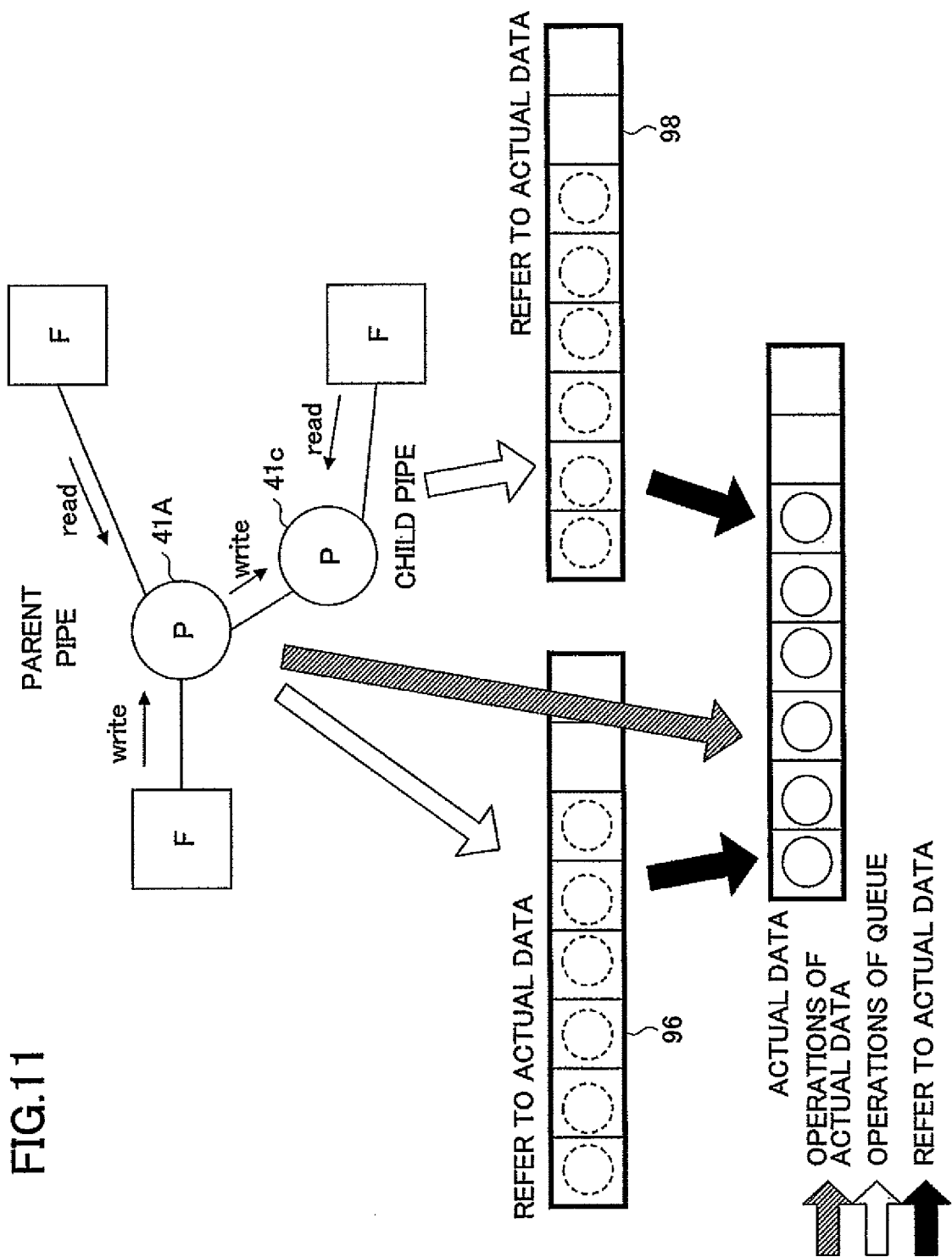
FIG. 11 is a view for explaining basic operations in a case where data are read from a subsequent stage filter of the pipe 41A and a child pipe 41c.

FIG. 11 is a view for explaining basic operations in a case where the data are read from a subsequent stage filter of the pipe 41A and the child pipe 41c.

First, a case where data are read from the pipe 41A is discussed.

When the pipe 41A receives an order for reading the data from the filter of the subsequent stage, the pipe 41A refers to the reference data written in the reference data storage part 96. The pipe 41A retrieves the actual data written in the memory based on the reference data so as to transmit the retrieved actual data to the filter of the subsequent stage.

When the child pipe 41c receives the order for reading the data from the filter of the subsequent stage, the child pipe 41c retrieves the actual data written in the memory based on the reference data written in the reference data storage part 98. The child pipe 41c transmits the retrieved actual data to the filter of the subsequent stage. In other words, the child pipe 41c performs the same operations as the pipe 41A.

Next, basic operations of the pipe 41A and the child pipe 41c after reading the data from the pipe 41A and the child pipe 41c by the filter is completed as shown in FIG. 11, are discussed with reference to FIG. 12.

Figure 12:
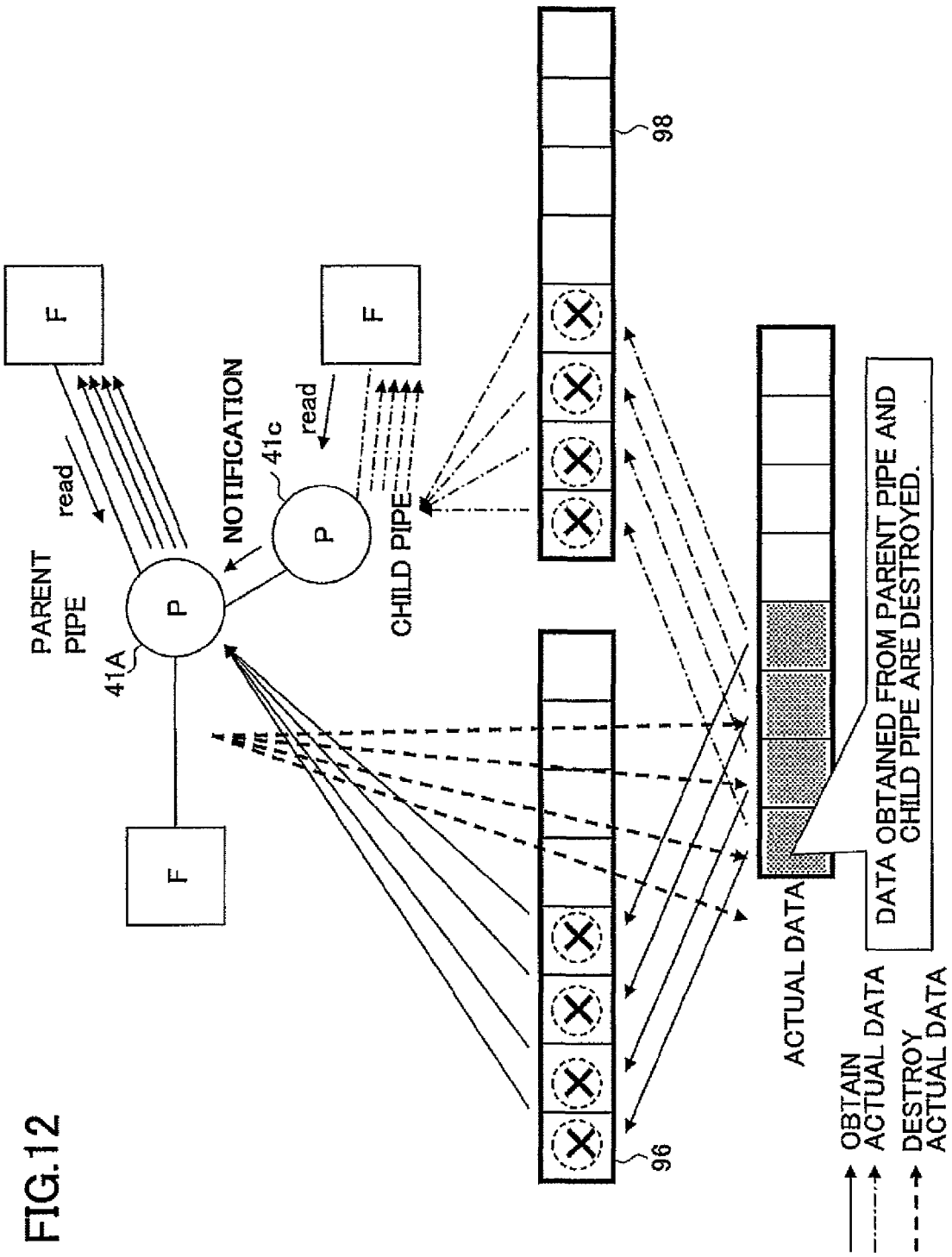
FIG. 12 is a view for explaining basic operations after the data are read from the subsequent stage filter of the pipe 41A and the child pipe 41c.

FIG. 12 is a view for explaining the basic operations after the data are read from the subsequent stage filter of the pipe 41A and the child pipe 41c.

As shown in FIG. 12, when the data are read at the filter of the subsequent stage of the child pipe 41c, the child pipe 41c reports that the data have been read to the pipe 41A. When the pipe 41A receives this report, in a case where the data written in the memory are already referred to by both the pipe 41A and the child pipe 41c, the actual data are destroyed by the data management part 93.

Figure 13:
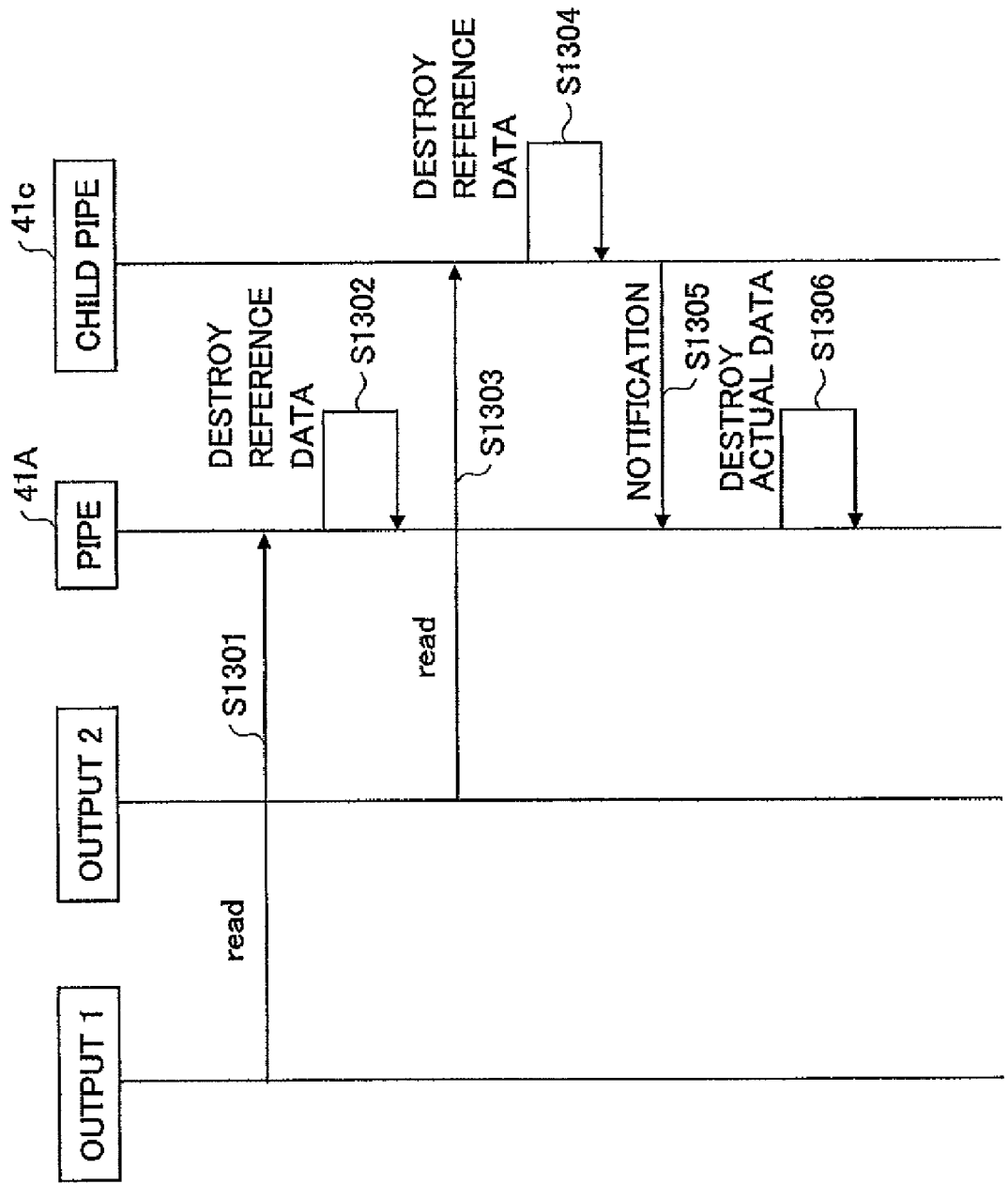
FIG. 13 is a sequence diagram for explaining a process of destroying actual data.

Next, destruction of the actual data is discussed with reference to FIG. 13. FIG. 13 is a sequential diagram for explaining a process of destroying the actual data.

In an example shown in FIG. 13, a filter of a subsequent stage of the pipe 41A is defined as an output 1 and a filter of a subsequent stage of the child pipe 41c is defined as an output 2.

Based on the order for reading from the output 1, the pipe 41A refers to the reference data and reads the actual data in step S1301. The pipe 41A destroys the reference data with respect to the actual data, written in the reference data storage part 96, in step S1302.

Next, based on the order for reading from the output 2, the pipe 41c refers to the reference data and reads the actual data in step S1303. The pipe 41c destroys the reference data with respect to the actual data, written in the reference data storage part 98, in step S1304. The child pipe 41c reports that the actual data have been read to the pipe 41A in step S1305.

When the pipe 41A confirms that the actual data have been read based on the reference data and have been retrieved by both the pipe 41A and the child pipe 41c, the data management part 93 of the pipe 41A destroys the actual data from the memory in step S1306.

In addition, the pipe 41A of the second embodiment of the present invention manages the retrieval status of the actual data in the pipe 41A and the child pipe 41c by using the retrieval status table 94.

The pipe 41A of the second embodiment of the present invention uses the retrieval status table 94 and manages the retrieval status of the actual data of the pipe 41A and the child pipe 41c.

The pipe 41A manages, by using the retrieval status table 94, the reference status of the reference data and the retrieval status of the actual data in the pipe 41A and the child pipe 41c. In a case where the reference data are referred to by both the pipe 41A and the child pipe 41c and then destroyed, the pipe 41A determines that the actual data have been read from the pipe 41A and the child pipe 41c and retrieved. When the actual data are retrieved from both the pipe 41A and the child pipe 41c, the actual data are deleted from the memory by the data management part 93.

Next, the retrieval status table 94 is discussed. FIG. 14 shows the retrieval status table 94.

In the pipe 41A, the data management part 93 destroys the actual data written in the memory based on the retrieval status table 94.

In the retrieval status table 94 shown in FIG. 14, the actual data 1 are retrieved by both the pipe 41A and the child pipe 41c. In this case, in the retrieval status table 94, information indicating that the actual data 1 are already retrieved in the pipe 41A and the child pipe 41c is stored as the retrieval status with respect to the actual data 1. Accordingly, the data management part 93 destroys the actual data 1 based on this information.

In the retrieval status table 94 shown in FIG. 14, the actual data 3 are retrieved from the pipe 41A and not retrieved yet from the pipe 41c. In this case, the retrieval status table 94 shows, as the retrieval status of the actual data 3, information of "already retrieved" with respect to the pipe 41A and information of "not retrieved yet" with respect to the child pipe 41c are stored. Accordingly, the data management part 93 keeps the actual data 3 based on this information.

Thus, the data management part 93 destroys the actual data when the actual data are retrieved by both the pipe 41A and the child pipe 41c, namely all pipes having the reference data with respect to the actual data. Accordingly, in the second embodiment of the present invention, the actual data already retrieved are not kept for a long time and the memory can be efficiently used.

Furthermore, in the second embodiment of the present invention, each of the pipe 41A and the child pipe 41c has the reference data storage part. Accordingly, the filter of the front stage of the pipe 41A can write the data to the pipe 41A at an optional timing. The subsequent filter of the pipe 41A and the pipe 41c can read the data from the pipe 41A at an optional timing. In addition, the subsequent filter of the child pipe 41c can read the data from the child pipe 41c at an optional timing.

Next, operations in a case where the specific data are read in the second embodiment of the present invention are discussed with reference to FIG. 15.

Figure 15:
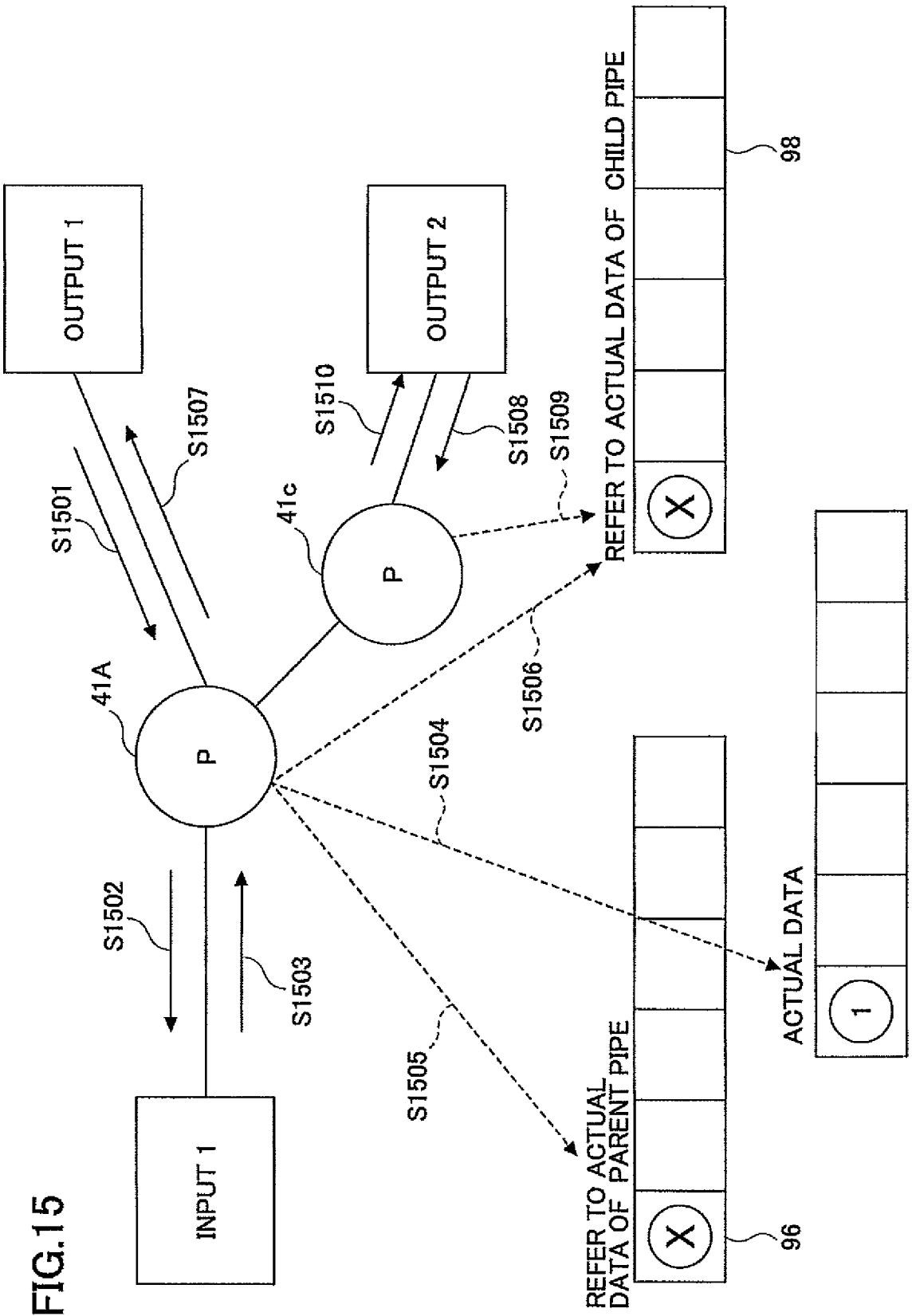
FIG. 15 is a view for explaining basic operations in a case where specific data are written in the pipe 41A in the second embodiment of the present invention.

FIG. 15 is a view for explaining basic operations in a case where specific data are written in the pipe 41A in the second embodiment of the present invention.

In the example shown in FIG. 15, a filter connected to an input side of the pipe 41A is defined as an input 1, a filter connected to an output side of the pipe 41A is defined as an output 1, and a filter connected to an output side of the child pipe 41c is defined as an output 2.

The pipe 41A and the child pipe 41c of the second embodiment of the present invention transmit the reading request including the identifier of the data from the output 1 or the output 2 to the input 1.

When the pipe 41A receives the reading request including the identifier 1 from the output 1 in step S1501, the pipe 41A transmits the reading request including the identifier 1 to the input 1 in step S1502. When the input 1 receives the reading request including the identifier 1, the input 1 outputs data corresponding to the identifier 1 in step S1503. When the data corresponding to the identifier 1 is output from the input 1, the data management part 93 in the pipe 41A writes the identifier 1 and the actual data which are output data into a memory controlled by the memory control part 53 in step S1504.

In addition the data management part 93 writes the identifier 1 and the reference data for referring to the actual data written in the memory to the reference data storage part 96 of the pipe 41A in step S1505.

Next, the data management part 93 writes the identifier 1 and the reference data to the reference data storage part 98 of the child pipe 41c in step S1506. Based on the reference data and the identifier 1, the pipe 41A writes the actual data corresponding to the identifier 1 to the output 1 in step S1507.

Next, a case where the child pipe 41c receives the reading request including the identifier 1 from the output 2 is discussed.

When the child pipe 41c receives the reading request including the identifier 1 from the output 2 in step S1508, the data management part 97 searches the reference data of the identifier 1 from the reference data storage part 98 in step S1509. In a case where there are corresponding reference data in the reference data storage part 98, the existence of the data is reported to the output 2 without transmitting the reading request to the pipe 41A by the child pipe 41c so as to write the actual data of the identifier 1 to the output 2 based on the reference data in step S1510.

In the second embodiment of the present invention, the input 1 does not receive the same reading request twice. Therefore, the input 1 may correspond to only the reading request from the pipe 41A and perform the same process as the single output process.

Next, a case where the request management table 95 is used in the second embodiment of the present invention is discussed with reference to FIG. 16.

Figure 16:
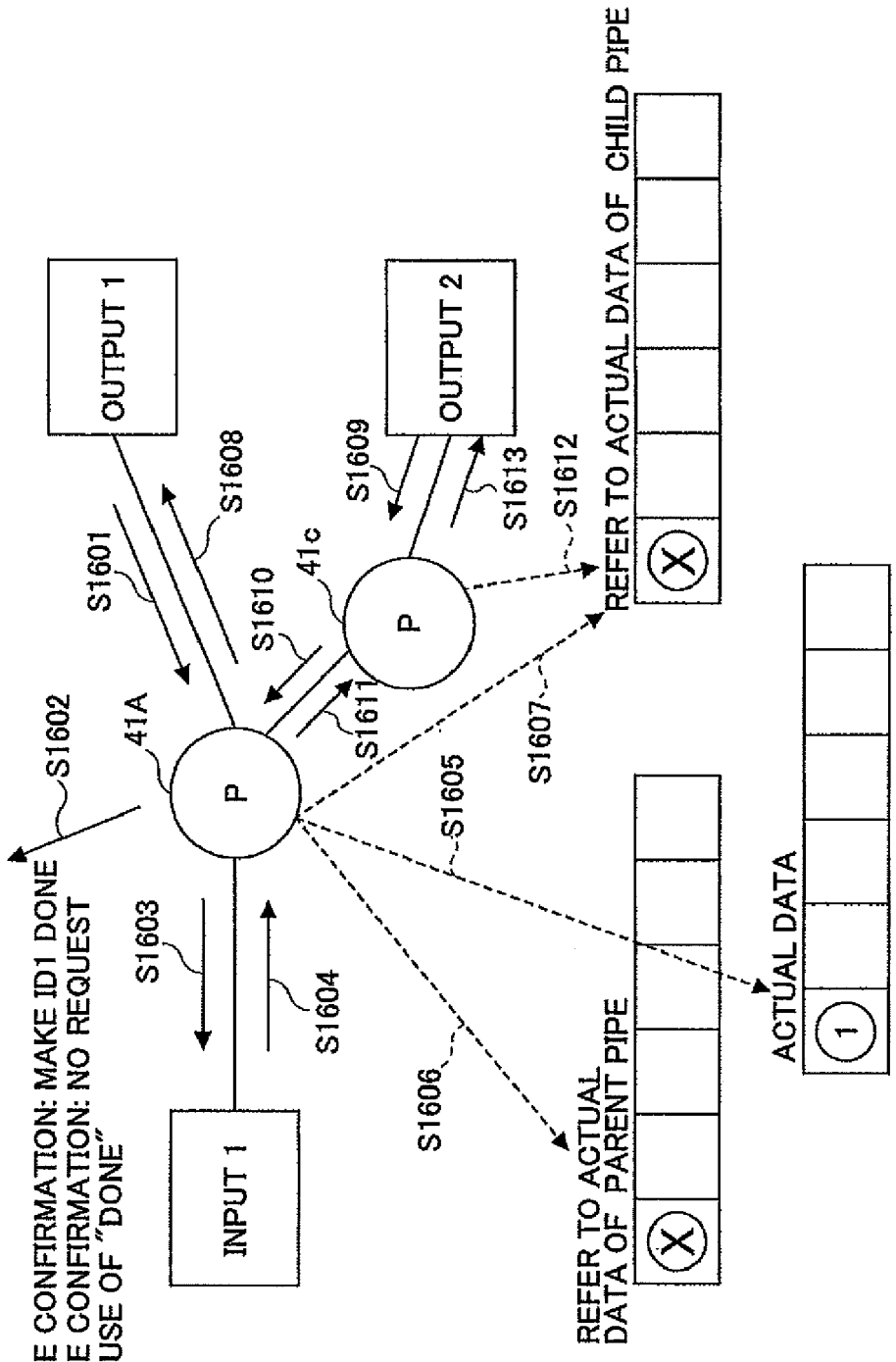
FIG. 16 is a view for explaining a case where the specific data are read by using a request management table 95 in the second embodiment of the present invention.

FIG. 16 is a view for explaining a case where the specific data are read by using a request management table 95 in the second embodiment of the present invention.

In an example shown in FIG. 16, the output 1 and the input 1 are connected to the pipe 41A and the output 2 is connected to the child pipe 41c.

The request management table 95 is discussed below.

Information indicating whether the reading request is transmitted from the pipe 41A to the input 1 is stored in the request management table 95 for every identifier.

In the request management table 95 shown in FIG. 16, the reading request of the data corresponding to the identifier 1 is already transmitted to the input 1. The reading request of the data corresponding to the identifier 1 through the identifier 4 is not transmitted to the input 1 yet.

When the reading request of the data including the identifier 1 is transmitted from the output 1 to the pipe 41A in step S1601, the pipe 41A refers to the request management table 95 by the data management part 93 so as to determine whether the reading request of the data corresponding to the identifier 1 has been transmitted to the input 1 in step S1602.

In a case where the reading request has not been transmitted to the request management table 95, the pipe 41A transmits the reading request to the input 1 in step S1603. The pipe 41A renews the request management table 95 so as to show that the reading request of the data to the identifier 1 is transmitted.

Processes from step S1604 to step S1608 are processes for writing data corresponding to the identifier 1 to the output 1 after the reading request is transmitted to the input 1 and the same as the processes from step S1503 to step S1507 in FIG. 15. Therefore, explanation of the processes from step S1604 to step S1608 is omitted.

Next, a case where the reading request including the identifier 1 is transmitted from the output 2 to the child pipe 41c is discussed.

When the reading request is transmitted from the output 2 to the child pipe 41c in step S1609 the child pipe 41c reports receipt of the reading request to the pipe 41A in step S1610. The pipe 41A receiving this report refers to the request management table 95 and determines whether the reading request of the data of the identifier 1 has been transmitted to the input 1.

For example, in the request management table 95 shown in FIG. 16, the reading request of the data of the identifier 1 is already transmitted to the input 1. Accordingly, the pipe 41A notifies the child pipe 41c that the reading request is already transmitted to the input 1 without transmitting the reading request to the input 1 in step S1611.

The child pipe 41c receiving the notification refers to the reference storage part 98 in step S1612. The child pipe 41c writes the actual data of the identifier 1, based on the reference data, to the output 2 in step S1613.

Thus, by using the request management table 95, the pipe 41A can determine whether the reading request received by the pipe 41A and the child pipe 41c is transmitted to the input 1. Accordingly, the pipe 41A can transmit only the reading request not transmitted to the input 1 to the input 1.

Because of this, the input 1 does not receive the same request twice and therefore may write the data requested when the reading request is received from the pipe 41A. In other words, the input 1 may perform the same operations as the single output process.

In addition, by using the request management table 95, for example, before writing data from the input 1 to the pipe 41A is completed, even if the child pipe 41c receives the reading request of the data of the same identifier, it is possible to determine whether the reading request has been transmitted to the input 1.

As discussed above, according to the second embodiment of the present invention, it is possible to reflect the reading request from the output side to the input side and improve the process speed. Furthermore, according to the second embodiment of the present invention, it is possible to prevent from overlapping with the filter of the input side of the pipe and performing the reading request of the data. Hence, it is possible to perform control of the filter in the multiple output process as well as the single output process.

Although the invention has been described with respect to specific embodiment for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2007-156668 filed on Jun. 13, 2007, the entire contents of which are hereby incorporated herein by reference.

What is claimed is:

1. An image processing device, comprising:
an input filter configured to control an input process of data to be input as a subject of an image process;
an output filter configured to control an output process of data to be output to an outside of the image processing device;
a processing filter configured to process the data between the input filter and the output filter;
a pipe configured to transmit the data among the input filter, the processing filter, and the output filter;
an operations part configured to perform process operations of the image processing device;
a control part configured to control the pipe; and
a dependent pipe generation part configured to generate a dependent pipe depending on and provided to the pipe, wherein
an application is formed by connecting the input filter, the processing filter, and the output filter to each other,
the pipe receives a reading request of the data including an identifier for identifying the data from the processing filter or the output filter connected to an output side of the pipe so as to transmit the reading request to the input filter or the processing filter, respectively, connected to an input side of the pipe,
in a case where plural output filters are selected for a single input filter selected by the operations part, the control part makes the pipe generate the dependent pipe by using the dependent pipe generation part,
the control part connects a single pipe or the single dependent pipe to an input side and/or an output side of the input filter, the processing filter, and the output filter so as to perform an output process, and
the dependent pipe transmits the reading request to the pipe generating the dependent pipe when the reading request is transmitted to the dependent pipe.

2. The image processing device as claimed in claim 1, wherein the input filter and/or the processing filter receives the reading request including the identifier and performs a process for generating data where the identifier is provided.

3. The image processing device as claimed in claim 1, wherein the identifier is provided for the data in the input process by the input filter.

4. The image processing device as claimed in claim 1, wherein each of the pipe and the dependent pipe has a data management part configured to manage the data in the pipe and the dependent pipe, respectively, the corresponding data management parts determine whether data corresponding to the identifier included in the reading request exist in the pipe and the dependent pipe, and the corresponding data management parts do not send the reading request in a case where the data corresponding to the identifier exists in the pipe and the dependent pipe.

5. The image processing device as claimed in claim 1, wherein the pipe includes a request management part configured to manage whether the reading request is transmitted to the processing filter or the input filter connected to a front stage of the pipe.

6. The image processing device as claimed in claim 5, wherein a data management part configured to manage data in each pipe and dependent pipe determines, based on the request management part, whether the reading request is transmitted to the processing filter or the input filter connected to a front stage of the pipe, and the data management part does not transmit the reading request to the input filter or the processing filter in a case where the reading request is already transmitted to the processing filter or the input filter connected to the front stage of the pipe.

7. An image processing method used for an image processing device, the image processing device including:
an input filter configured to control an input process of data to be input as a subject of an image process;
an output filter configured to control an output process of data to be output to an outside of the image processing device;
a processing filter configured to process the data between the input filter and the output filter;
a pipe configured to transmit the data among the input filter, the processing filter, and the output filter;
wherein an application is formed by connecting the input filter, the processing filter, and the output filter to each other,
the image processing method comprising the steps of:
receiving, by the pipe, a reading request of the data including an identifier for identifying the data from the processing filter or the output filter connected to an output side of the pipe;
transmitting the reading request to the input filter or the processing filter, respectively, connected to an input side of the pipe;
generating a dependent pipe depending on and provided to the pipe in a case where plural output filters are selected for a single input filter;
connecting a single pipe or the single dependent pipe to an input side and/or an output side of the input filter, the processing filter, and the output filter so as to perform an output process; and
transmitting, by the dependent pipe, the reading request to the pipe when the reading request is transmitted to the dependent pipe.

8. The image processing method as claimed in claim 7, further comprising the step of receiving, by the input filter and/or the processing filter, the reading request including the identifier and performing a process for generating data where the identifier is provided.

9. The image processing method as claimed in claim 7, further comprising the step of providing the identifier for the data in the input process by the input filter.

10. The image processing method as claimed in claim 7, further comprising the steps of:
managing the data in the pipe and the dependent pipe;
determining whether data corresponding to the identifier included in the reading request exist in the pipe and the dependent pipe; and
not sending the reading request in a case where the data corresponding to the identifier exists in the pipe and the dependent pipe.

11. The image processing method as claimed in claim 10, further comprising the step of:
determining whether the reading request is transmitted to the processing filter or the input filter connected to a front stage of the pipe; and
not transmitting the reading request to the input filter or the processing filter in a case where the reading request is already transmitted to the processing filter or the input filter connected to the front stage of the pipe.

12. The image processing method as claimed in claim 7, further comprising the step of managing whether the reading request is transmitted to the processing filter or the input filter connected to a front stage of the pipe.

13. A non-transitory computer program product for image processing, the product having an image processing program, the image processing program used for an image processing device, the image processing device having a processing device and a storage device, the image processing device including:
- an input filter configured to control an input process of data to be input as a subject of an image process;
- an output filter configured to control an output process of data to be output to an outside of the image processing device;
- a processing filter configured to process the data between the input filter and the output filter;
- a pipe configured to transmit the data among the input filter, the processing filter, and the output filter;
- wherein an application is formed by connecting the input filter, the processing filter, and the output filter to each other, and
- the image processing program is performed by implementing an image processing method by the processing device, the image processing method comprising the steps of:
  - receiving, by the pipe, a reading request of the data including an identifier for identifying the data from the processing filter or the output filter connected to an output side of the pipe;
  - transmitting the reading request to the input filter or the processing filter, respectively connected to an input side of the pipe;
  - generating a dependent pipe depending on and provided to the pipe in a case where plural output filters are selected for a single input filter;
  - connecting a single pipe or the single dependent pipe to an input side and/or an output side of the input filter, the processing filter, and the output filter so as to perform an output process; and
  - transmitting, by the dependent pipe, the reading request to the pipe when the reading request is transmitted to the dependent pipe.

14. The non-transitory computer program as claimed in claim 13, further comprising the step of receiving, by the input filter and/or the processing filter, the reading request including the identifier and performing a process for generating data where the identifier is provided.

15. The non-transitory computer program as claimed in claim 13, further comprising the step of providing the identifier for the data in the input process by the input filter.

16. The non-transitory computer program as claimed in claim 13, further comprising the steps of:
- managing the data in the pipe and the dependent pipe;
- determining whether data corresponding to the identifier included in the reading request exist in the pipe and the dependent pipe; and
- not sending the reading request in a case where the data corresponding to the identifier exists in the pipe and the dependent pipe.

17. The non-transitory computer program as claimed in claim 13, further comprising the step of managing whether the reading request is transmitted to the processing filter or the input filter connected to a front stage of the pipe.

* * * * *